United States Patent
Itoh

(10) Patent No.: US 7,277,492 B2
(45) Date of Patent: Oct. 2, 2007

(54) TRANSMISSION APPARATUS, TRANSMISSION CONTROL METHOD, RECEPTION APPARATUS, AND RECEPTION CONTROL METHOD

(75) Inventor: Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 739 days.

(21) Appl. No.: 10/415,223

(22) PCT Filed: Aug. 28, 2002

(86) PCT No.: PCT/JP02/08646

§ 371 (c)(1),
(2), (4) Date: Apr. 25, 2003

(87) PCT Pub. No.: WO03/021855

PCT Pub. Date: Mar. 13, 2003

(65) Prior Publication Data

US 2004/0047425 A1 Mar. 11, 2004

(30) Foreign Application Priority Data

Aug. 28, 2001 (JP) .............................. 2001-258696

(51) Int. Cl.
*H04L 27/00* (2006.01)
(52) U.S. Cl. ...................... 375/259; 375/219; 375/222; 375/220; 375/221; 455/73
(58) Field of Classification Search ................ 375/219, 375/229
See application file for complete search history.

(56) References Cited

U.S. PATENT DOCUMENTS 5,493,609 A * 2/1996 Winseck et al. ......... 379/93.08
5,577,087 A * 11/1996 Furuya ........................ 375/377
6,330,278 B1* 12/2001 Masters et al. ............. 375/223
6,549,759 B2* 4/2003 Arviv et al. ................... 455/69
6,760,882 B1* 7/2004 Gesbert et al. ............. 714/774

(Continued)

FOREIGN PATENT DOCUMENTS

EP 0 986 282 3/2000

(Continued)

OTHER PUBLICATIONS

Lau V K N et al: "On Integrating Multiple Access Control and Adaptive Channel Coding for Cellular Wireless Voice and Data Services", Computer Communications, Elsevier Science Publishers BV, Amsterdam, NL, vol. 24, No. 10, May 15, 2001, pp. 903-916, XP004240641.

*Primary Examiner*—Chieh M. Fan
*Assistant Examiner*—Siu M Lee
(74) *Attorney, Agent, or Firm*—Frommer Lawrence & Haug LLP; William S. Frommer; Paul A. Levy

(57) ABSTRACT

Radio resources are saved. The base station 101 determines a possibility of transmitting data to the terminal 102, and transmits the indicator indicating the possibility of transmitting the data to the terminal 102. The terminal 102 generates a mode request message for determining a coding rate and a modulation system at the base station 101, and sets a transmission frequency of the mode request message based on the indicator transmitted from the base station 101. Accordingly, the mode request message is transmitted from the terminal 102 to the base station 101 at the determined transmission frequency.

12 Claims, 17 Drawing Sheets

U.S. PATENT DOCUMENTS

| | | |
|---|---|---|
| 6,940,915 B2 * | 9/2005 | Tang .......................... 375/261 |
| 7,006,798 B2 * | 2/2006 | Miyoshi et al. ........... 455/67.11 |
| 7,016,296 B2 * | 3/2006 | Hartman, Jr. ................ 370/204 |
| 2003/0002495 A1 * | 1/2003 | Shahar et al. ............... 370/389 |
| 2003/0039226 A1 * | 2/2003 | Kwak ......................... 370/329 |
| 2003/0185181 A1 * | 10/2003 | Balachandran et al. ..... 370/337 |

FOREIGN PATENT DOCUMENTS

| | | |
|---|---|---|
| JP | 2000-513547 | 10/2000 |
| JP | 2001-103032 | 4/2001 |
| WO | WO99/45660 | 9/1999 |

* cited by examiner

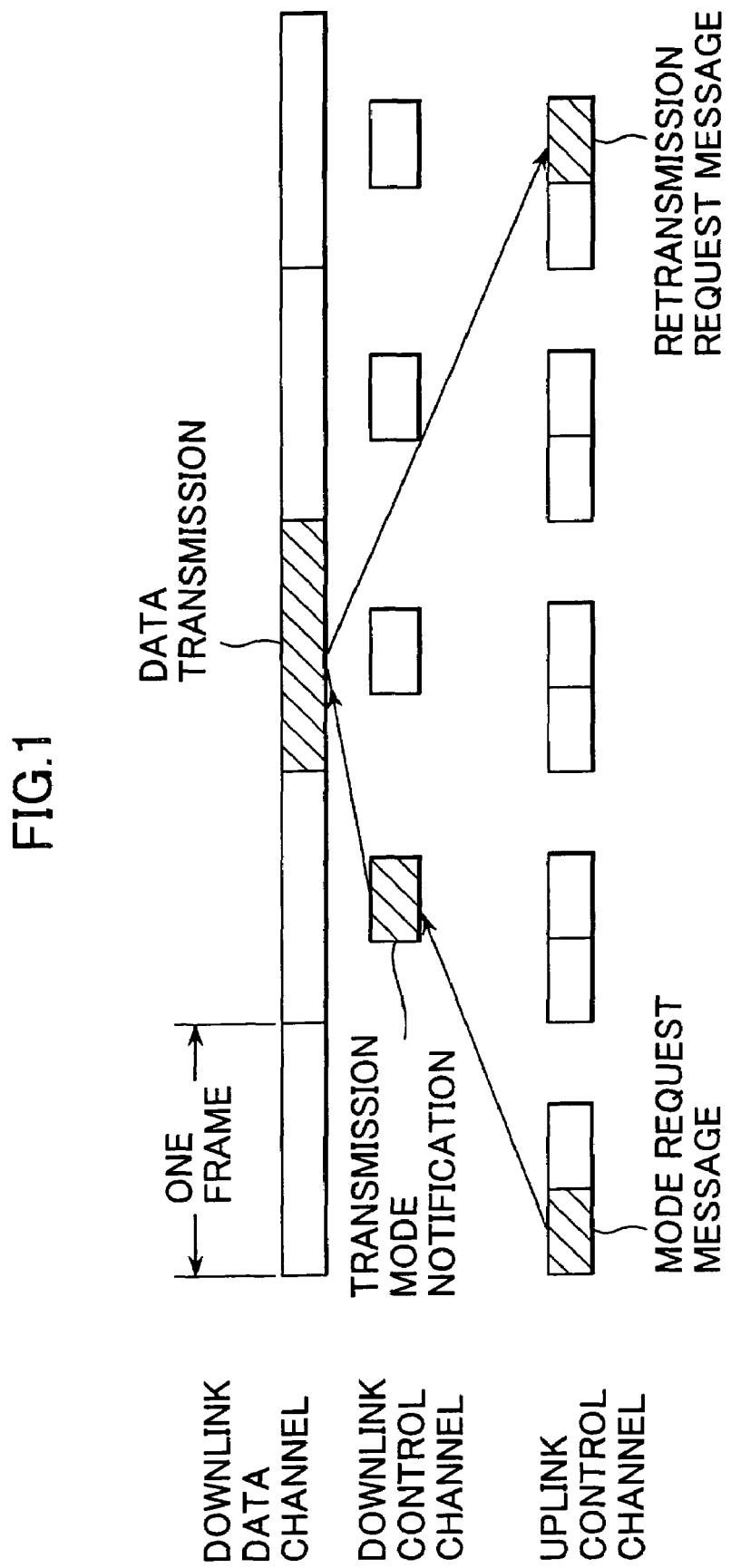

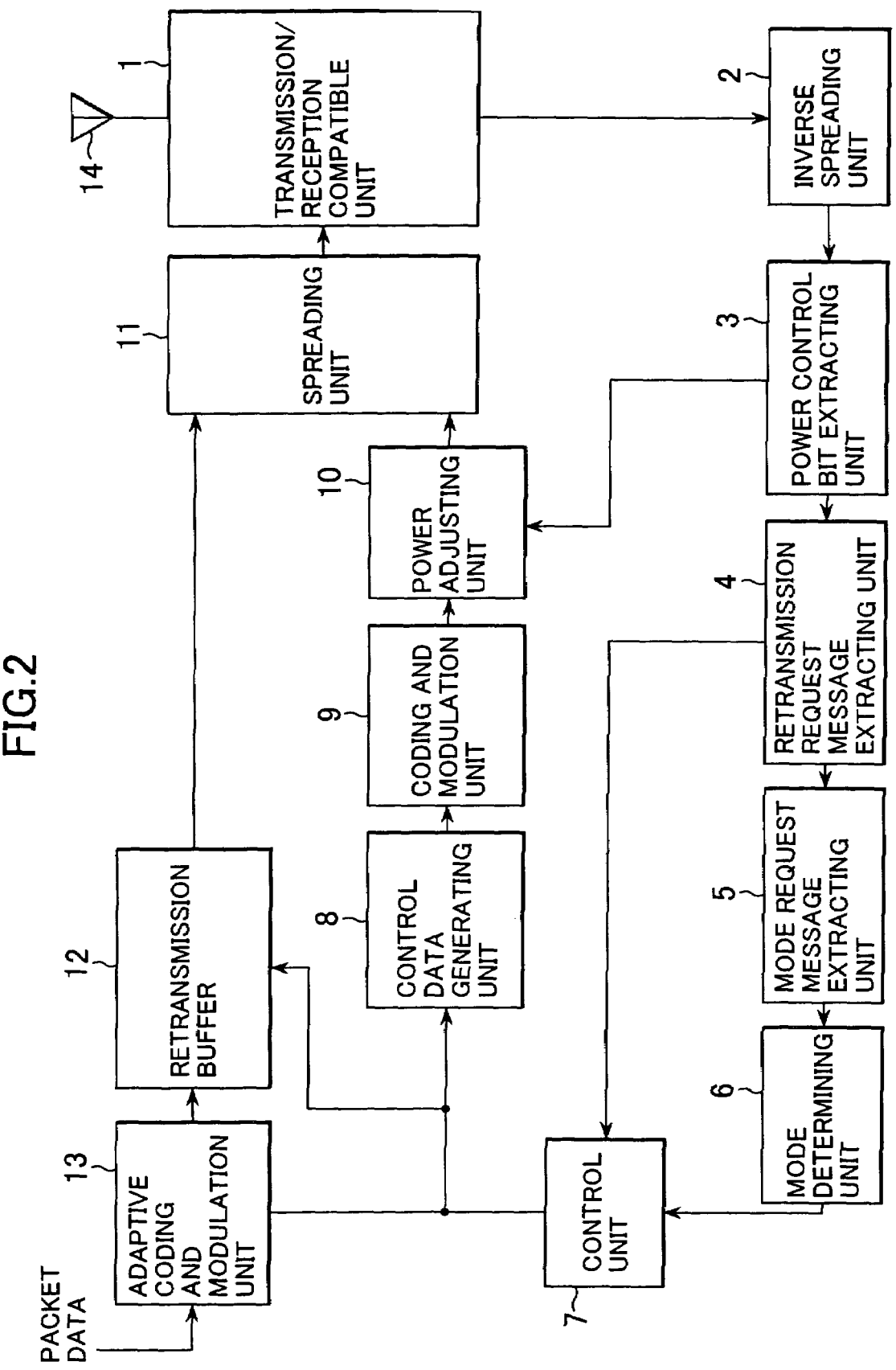

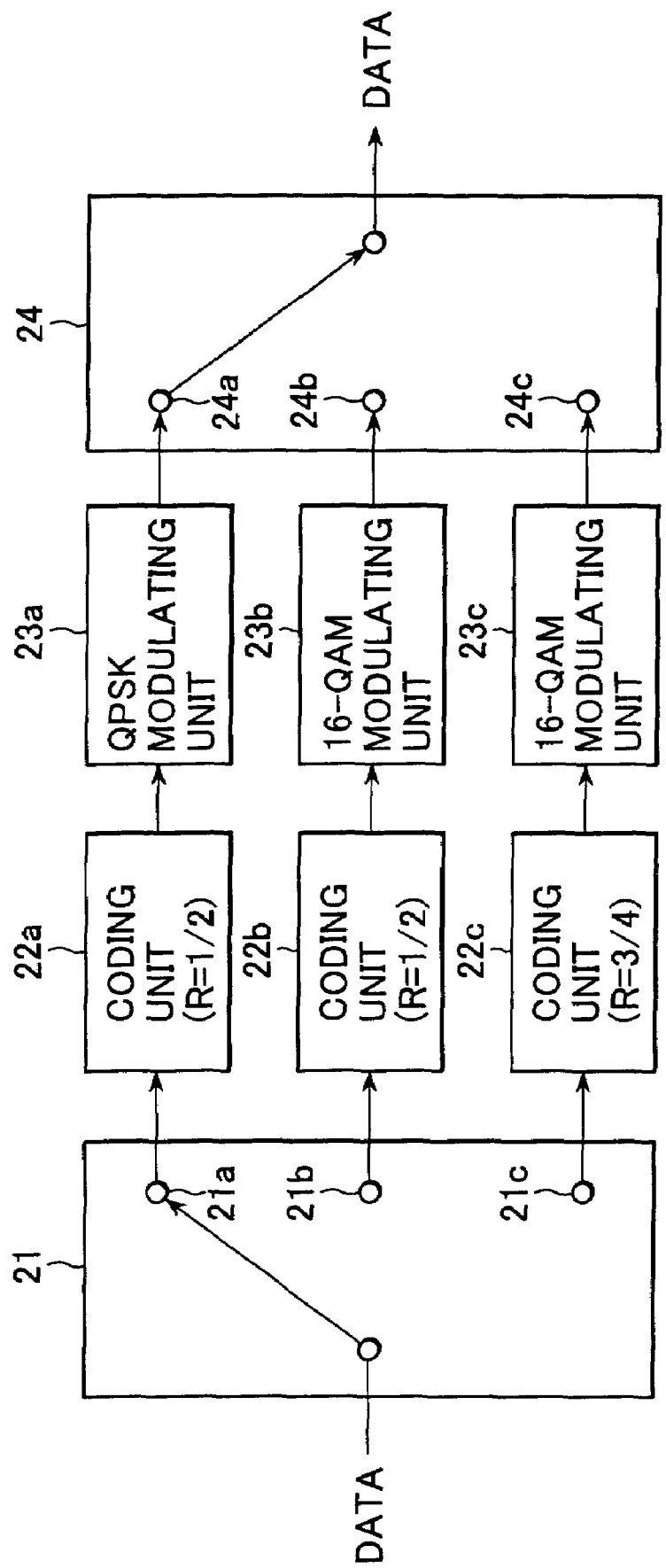

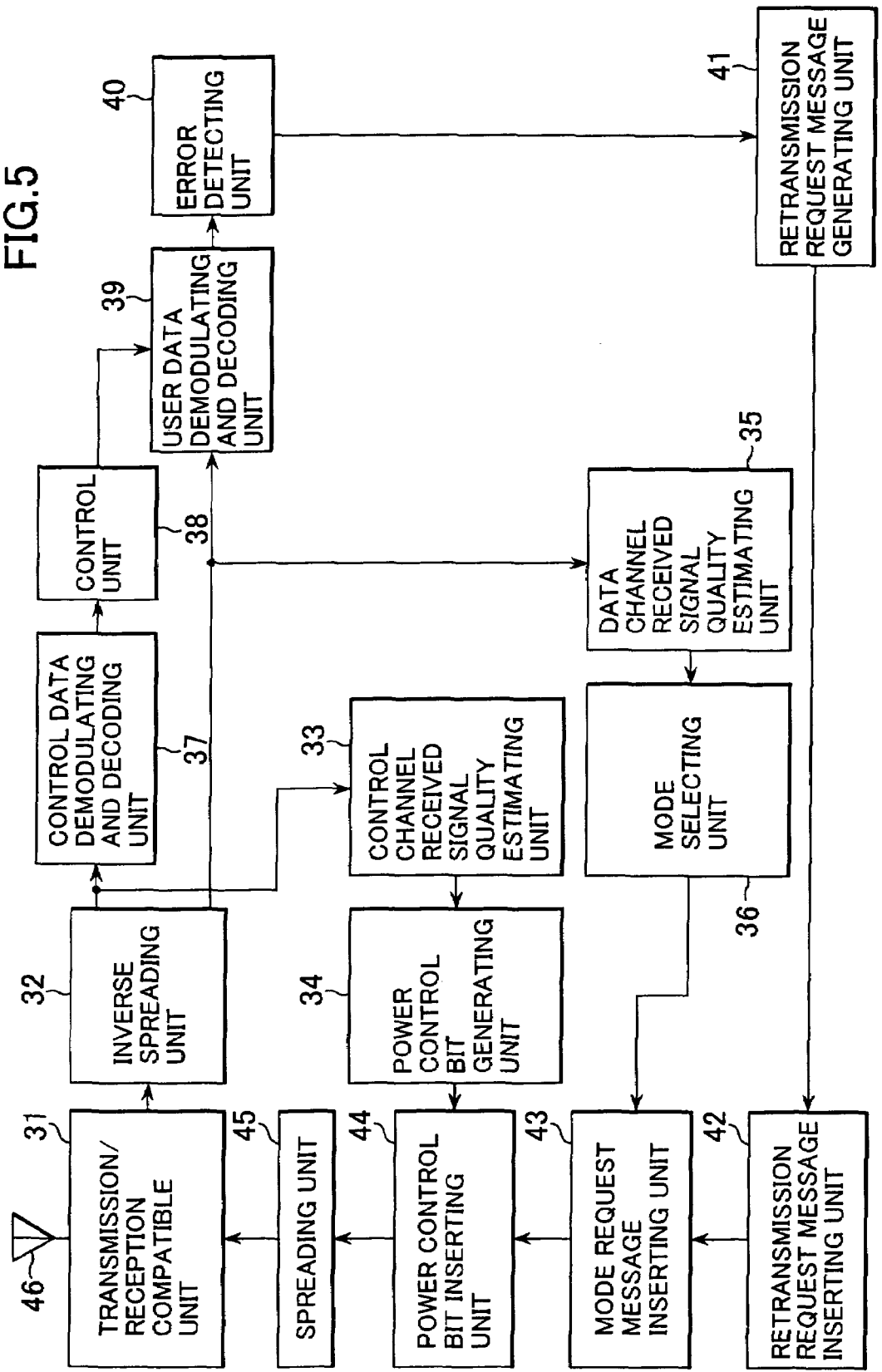

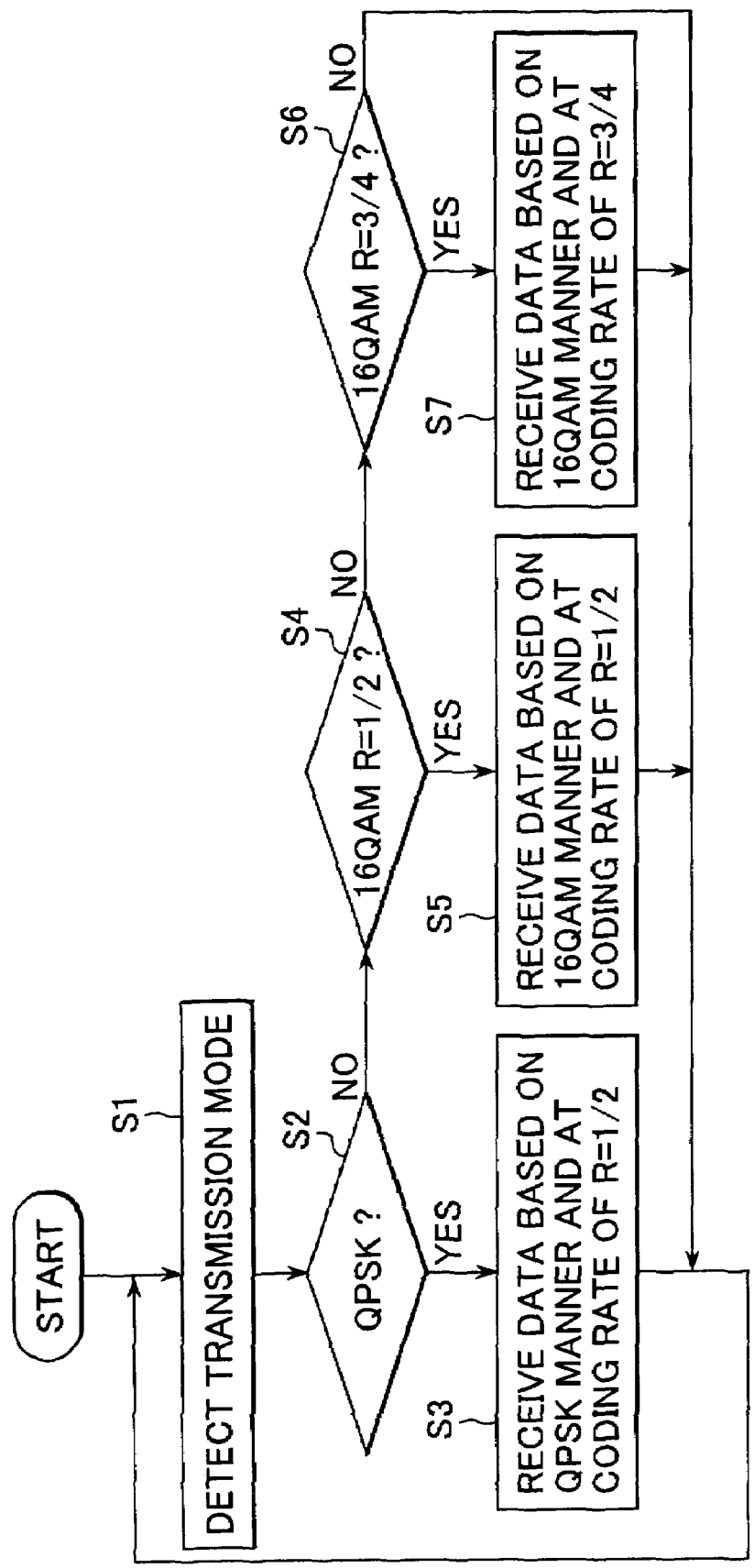

TRANSMISSION APPARATUS, TRANSMISSION CONTROL METHOD, RECEPTION APPARATUS, AND RECEPTION CONTROL METHOD

TECHNICAL FIELD

The present invention relates to a transmission apparatus and a method for controlling transmission, and further relates to a receiving apparatus and a method for controlling reception. More particularly, the present invention relates to, for example in a portable telephone system, a transmission apparatus and a method for controlling transmission capable of saving radio resources and enabling low power consumption of a portable telephone, and further relates to a receiving apparatus and a method for controlling reception.

BACKGROUND ART

An adaptive modulation and coding rate communication system has been proposed to present a high rate communication while sacrificing noise resistant characteristic to a user who holds a propagation path of a high quality, and to present a low rate communication while keeping the noise resistant characteristic to a user who only has a propagation path of a low quality, by changing the coding rate of an error correction code and the degree of multilevel modulation in accordance with the quality of the propagation path.

The adaptive modulation and coding rate communication system of this kind (here-in-after referred to as an adaptive and modulation system, accordingly) has recently been introduced in a radio communication system, and as for one example, there are GSM (Global System for Mobile Communications), EDGE, HDR (High Data Rate), 1xTREAM, and the like. Further, it is expected that the same communication system will be introduced into a communication situation using a W-CDMA (Wideband-Code Division Multiple Access).

In the situation using the adaptive coding and modulation system, the following fundamental procedures are carried out so as to attain the adaptive coding and modulation on the communication between a base station and a terminal.

1. The terminal determines the received quality of a signal which is transmitted from the base station.

2. The terminal notifies information representing the most suitable modulation system and coding rate (here-in-after referred to as a mode request message, accordingly) base on the determination result of the received signal quality to the base station.

3. The base station determines a modulation system and a coding rate to be actually assigned to the terminal based on a received signal quality message transmitted from the terminal and status of resources owned by the base station, and then transmits information representing the determined modulation system and the coding rate (here-in-after referred to as a transmission mode, accordingly) to the terminal.

4. The base station encodes and modulates the user data based on the coding rate and the modulation system corresponding to the transmission mode, and then transmits to the terminal.

5. The terminal receives the transmission mode and carries out a data receiving processing based on the received transmission mode.

6. If the terminal detects any error in the received data after carrying out the error correction, the terminal transmits a retransmission request, while if the terminal can accurately receive the data, the terminal transmits a new data transmission request back to the base station.

7. The above steps 1 to 6 are periodically repeated.

FIG. 1 illustrates a manner of the above mentioned processing sequence. As shown in this figure, illustrated are relations among a downlink control channel for notifying the transmission mode from the base station to the terminal, a downlink data channel for transmitting the user data from the base station, and an uplink control channel for transmitting a transmission mode request message from the terminal. An example shown in this figure is the one in which the above mentioned steps 1 to 6 are repeated at a predetermined frame period.

That is, as shown in FIG. 1, the terminal determines the received signal quality at the terminal at the current timing point, and then determines a transmission mode to request to the base station based on the received signal quality. Further, the terminal transmits a mode request message indicative of the transmission mode to the base station through the uplink control channel.

The base station determines a transmission mode based on the transmitted mode request message and radio resources owned by the base station, then transmits the thus determined transmission mode to the terminal through the downlink control channel. Furthermore, the base station carries out coding and modulation of the user data based on the coding rate and the modulation system corresponding to the transmission mode transmitted to the terminal, and then the transmits to the terminal through the downlink data channel.

Then the terminal receives the transmission mode transmitted from the base station in the previous stage, and the terminal recognizes the modulation system and the coding rate of the user data transmitted from the base station, thereby. The terminal further receives the user data transmitted from the base station thereafter and carries out the demodulation based on the demodulation system which corresponds to the modulation system designated by the transmission mode transmitted in advance.

The terminal carries out error detection of the user data which is obtained by the demodulation and the decoding, and, if no error is detected, then the terminal transmits a request message for new user data and a mode request message to the base station through the uplink control channel, for example.

On the other hand, if any error is detected in the user data obtained by carrying out the demodulation and the decoding, then the terminal transmits a retransmission request message requesting that the base station should retransmit the same user data through the uplink control channel to the base station. When the base station receives the retransmission request message, then the base station retransmits the user data again to the terminal.

The terminal receives the user data retransmitted from the base station, and carries out the error detection. And if the terminal detects any error in the user data, then the terminal transmits a retransmission request message again to the base station, and in this way, the similar processing is repeated. On the other hand, if the terminal detects no error in the user data after carrying out the error correction processing, as described above, the terminal transmits a request message for new user data and the mode request message to the base station through the uplink control channel, for example.

FIG. 1 contains terms of downlink data channel, downlink control channel, and uplink control channel. The words "downlink" and "uplink" mean a channel of a signal transmitted from the base station to the terminal and a channel of a signal transmitted from the terminal to the base station, respectively. That is, the word "downlink" is utilized for a name of a channel through which the signal is transmitted from the base station to the terminal and the word "uplink" is utilized for a name of a channel through which a signal is transmitted from the terminal to the base station.

Further, a retransmission request message can employ a flag of one bit, for example, and in this case, it is able to represent a request for retransmission if its value is "1", and to represent a request for a new user data if it is "0".

FIG. 2 is a diagram showing an example of an arrangement of a conventional base station which realizes a communication system employing an adaptive modulation and coding rate (adaptive coding and modulation system).

The base station is arranged to include a transmission/reception compatible unit 1, an inverse spreading unit 2, a power control bit extracting unit 3, a retransmission request message extracting unit 4, a mode request message extracting unit 5, a mode determining unit 6, a control unit 7, a control data generating unit 8, a coding and modulation unit 9, a power adjusting unit 10, a spreading unit 11, a retransmission buffer 12, an adaptive coding and modulation unit 13, and an antenna 14.

The base station demodulates the transmitted signal from a user by the transmission/reception compatible unit 1 and the inverse spreading unit 2.

That is, for example, a signal carried out a spectrum spreading is transmitted to the base station from a terminal capable of doing radio communication composed of a portable telephone, PDA (Personal Digital Assistant) or the like. The transmitted signal is received by the antenna 14 and supplied to the transmission/reception compatible unit 1. The transmission/reception compatible unit 1 is supplied with the transmission signal from the antenna 14 and subjects the signal to a necessary processing, and then supplies to the inverse spreading unit 2. The inverse spreading unit 2 carries out an inverse spectrum spreading on the signal supplied from the transmission/reception compatible unit 1 and supplies the resultant signal to the power control bit extracting unit 3.

The power control bit extracting unit 3 extracts a power control bit from the signal supplied from the inverse spreading unit 2. That is, the transmitted signal to be transmitted from the terminal to the base station contains the power control bit as a one-bit flag indicating a request of increase or decrease of power transmitted through the downlink control channel as described with reference to FIG. 1. The power control bit extracting unit 3 extracts this power control bit from the signal supplied from the inverse spreading unit 2 and transfers the power control bit to the power adjusting unit 10.

The power control bit extracting unit 3 extracts the power control bit from the signal supplied from the inverse spreading unit 2 and further supplies the signal to the retransmission request message extracting unit 4. The retransmission request message extracting unit 4 extracts the retransmission request message from the signal supplied from the power control bit extracting unit 3.

That is, the transmitted signal transmitted from the terminal to the base station contains the retransmission request message indicating whether the user data retransmission is requested or not, as described with reference to FIG. 1. The retransmission request message extracting unit 4 extracts the retransmission request message from the signal supplied from the power control bit extracting unit 3 and transmits the retransmission request message to the control unit 7.

The retransmission request message extracting unit 4 extracts the retransmission request message from the signal supplied from the power control bit extracting unit 3 and also transmits the signal to the mode request message extracting unit 5. The mode request message extracting unit 5 extracts the mode request message from the signal supplied from the retransmission request message extracting unit 4.

That is, the transmitted signal transmitted from the terminal to the base station contains the mode request message indicating the transmission mode determined based on the received signal quality at the terminal, as described with reference to FIG. 1. The mode request message extracting unit 5 extracts the mode request message from the signal supplied from the retransmission request message extracting unit 4 and then transfers the same to the mode determining unit 6.

In this case, the signal exchanged between the terminal and the base station is composed of frames each having a predetermined time span. Further, each frame is composed of a plural number, e.g., N, of slots of which time span unit is 0.6667 msec (millisecond), for example. The above described power control bit is arranged so that the power control bit is transmitted from the terminal to the base station at each slot. Therefore, the power control bit extracting unit 3 extracts the power control bit at every slot. Further, when the terminal transmits the signal, the retransmission request message and the mode request message are disposed at every frame. Therefore, the retransmission request message extracting unit 4 and the mode request message extracting unit 5 carry out respective extracting operations at every frame to extract the retransmission request message and the mode request message.

The mode determining unit 6 determines an optimum modulation system and coding rate in accordance with the mode request message and the state of the resources owned by the base station, and assigns code resources and power resources to the user (terminal).

Namely, if there is enough margin in the resources of the base station, the mode determining unit 6 determines the transmission mode represented by the mode request message as the transmission mode to be assigned as it is (here-in-after referred to as a assigned transmission mode, accordingly). On the contrary, if there is not any margin in the resources of the base station, the mode determining unit 6 determines the transmission mode which uses less resources as the assigned transmission mode instead of the transmission mode represented by the mode request message.

Then, when the mode determining unit 6 determines the assigned transmission mode, then transmits the assigned transmission mode to the control unit 7.

Initially, the control unit 7 confirms the retransmission request message transmitted from the retransmission request message extracting unit 4, and if it is confirmed that there is a retransmission request message, the control unit 7 transmits information indicative of a transmission mode identical to that upon initially transmitting the user data (i.e., the transmission mode upon transmitting the user data which is requested a retransmission) and a retransmission flag indicating that this transmission is a retransmission, to the control data generating unit 8 and the retransmission buffer 12. Further, if there is no retransmission request, the control unit 7 transfers a transmission mode (assigned transmission mode) determined by the mode determining unit 6 to the control data generating unit 8 and the adaptive coding and modulation unit 13.

The control data generating unit 8 generates control data including the transmission mode to be supplied from the control unit 7, and supplies to the coding and modulation unit 9. If the control data generating unit 8 is supplied with a retransmission request flag in addition to the information indicative of the transmission mode from the control unit 7, the control data generating unit 8 makes the retransmission request flag be involved in the control data. The coding and modulation unit 9 subjects the control data supplied from the control data generating unit 8 to a coding and modulation processing which is effected in a predetermined system, then, supplies the resultant modulated signal to the power adjusting unit 10.

The power adjusting unit 10 determines a level of transmission power for transmitting data through the downlink control channel described with reference to FIG. 1, in accordance with the power control bit supplied from the power control bit extracting unit 3. That is, as described above, the power control bit is a one-bit flag, for example. When the power control bit is "1", then the power adjusting unit 10 increases the transmission power for the downlink control channel by 1 dB. When the power control bit is "0", then the power adjusting unit 10 decreases the transmission power for the downlink control channel by 1 dB. Thus, the modulated signal supplied from the coding and modulation unit 9 is processed. In this way, it becomes possible to provide an arrangement for transmitting data through the downlink control channel to the terminal at an optimum power. Incidentally, in a communication using the CDMA, this manner of controlling the transmission power in the downlink control channel has been generally employed.

The modulated signal carried out the transmission power adjustment in the power adjusting unit 10 is supplied to the spreading unit 11.

Meanwhile, the packet data is supplied to the adaptive coding and modulation unit 13, wherein the user data is allocated in the packet data and the user data is to be transmitted through the downlink data channel which is described with reference to FIG. 1. The adaptive coding and modulation unit 13 subjects the packet data to a coding processing by using the coding rate which is indicated in the transmission mode information supplied from the control unit 7. Further, the adaptive coding and modulation unit 13 effects the modulation processing on the coded packed data by using the modulation system which is indicated in the transmission mode information. Thus, the modulated signal obtained by the coding and modulating the packet data is supplied to the retransmission buffer 12.

In this case, there are provided $R=\frac{1}{2}$ and $R=\frac{3}{4}$ as coding rate (coding system) and QPSK (Quadrature Phase Shift Keying) and 16QAM (Quadrature Amplitude Modulation) as modulation system, three kinds of transmission modes #0 to #2 are explained here. In this case, the transmission mode is not limited to these three, and is able to prepare many types of modes by the combination of the coding rate and the modulation system.

The coding rate of $R=\frac{1}{2}$ means that a redundant bit of one bit is added to every one bit of input data. The coding rate of $R=\frac{3}{4}$ means that a redundant bit of one bit is added to every three bits of input data. If the data is coded at the coding rate of $R=\frac{1}{2}$, as compared with a case in which the data is coded at the coding rate of $R=\frac{3}{4}$, the whole data contains a larger number of redundant bits relative to the input data. Therefore, the error correction capability is strengthen but only small amount of data can be transmitted. Conversely, if the data is coded at the coding rate of $R=\frac{3}{4}$, as compared with a case in which the data is coded at the coding rate of $R=\frac{1}{2}$, the whole data contains a smaller number of redundant bits relative to the input data. Therefore, the error correction capability is inferior to the case in which the data is coded at the coding rate of $R=\frac{1}{2}$ but a large amount of data can be transmitted.

Further, in the QPSK modulation system, as shown in FIG. 3A, the coded data are converted into symbols composed of two bits, and these symbols are mapped on any of four-symbol group, and in the 16QAM modulation system, as shown in FIG. 3B, the coded data are converted into symbols composed of four bits, and these symbols are mapped on any of 16-symbol group. If it is assumed that a symbol rate capable of being transmitted is constant, the modulation system of the 16QAM has a larger amount of data actually being transmitted than the modulation system of the QPSK. However, since the modulation system of the 16QAM has a smaller intersymbol distance than the modulation system of the QPSK, the noise characteristic is to be deteriorated.

Now that a combination of the coding rate of $R=\frac{1}{2}$ and the modulation system of the QPSK, a combination of the coding rate of $R=\frac{1}{2}$ and the modulation system of the 16QAM, and a combination of the coding rate of $R=\frac{3}{4}$ and the modulation system of the 16QAM are defined as transmission modes of #0, #1, and #2, respectively, then the relation of the data transfer rate among these transmission modes is to be given as follows. That is, the transmission mode of #0 ($R=\frac{1}{2}$, QPSK)<the transmission mode of #1 ($R=\frac{1}{2}$, 16QAM)<the transmission mode of #2 ($R=\frac{3}{4}$, 16QAM). On the other hand, the relation of the noise withstand characteristic among these transmission modes can be given as follows. That is, the transmission mode of #0 ($R=\frac{1}{2}$, QPSK)>the transmission mode of #1 ($R=\frac{1}{2}$, 16QAM)>the transmission mode of #2 ($R=\frac{3}{4}$, 16QAM).

According to the adaptive coding and modulation system, the coding rate and the modulation system can be selectively determined depending on the nature of the signal transmission path. That is, if the noise level is low and the transmission path is good (i.e., the received signal quality at the terminal is good), a combination (transmission mode) of the coding rate and the modulation system providing a large amount of data transfer rate is selected to carry out effective data transmission. Conversely, if the noise level is high and the transmission path is bad (i.e., the received signal quality at the terminal is bad), a combination of the coding rate and the modulation system providing a high noise withstand characteristic (transmission mode) is selected to carry out data transmission in which the data transfer rate is suppressed and error correction characteristic is strengthened.

FIG. 4 is a diagram showing an arrangement of the adaptive coding and modulation unit 13 in which three transmission modes, i.e., modes of #0 to #2 shown in FIG. 2 are prepared.

The packet data inputted into the adaptive coding and modulation unit 13 is supplied to a switch 21.

If the transmission mode information supplied from the control unit 7 indicates the transmission mode #0, the switch 21 selects a terminal 21a and a switch 24 selects a terminal 24a.

The terminal 21a is connected to a coding unit 22a. Therefore, if the transmission mode is of #0, the packet data is supplied from the switch 21 to the coding unit 22a. The coding unit 22a encodes the packet data supplied thereto at the coding rate of $R=\frac{1}{2}$ so that an error correction code is added to the data. The resultant coded data is supplied to a QPSK modulating unit 23a. The QPSK modulating unit 23a effects a QPSK modulation on the coded data supplied from the coding unit 22a so that modulated symbols are mapped to form a constellation. The resultant modulated signal is supplied to the terminal 24a of the switch 24. When the transmission mode is of #0, as described above, the switch 24 selects the terminal 24a. Therefore, the modulated signal outputted from the QPSK modulating unit 23a is supplied through the switch 24 to the retransmission buffer 12 (FIG. 2).

On the contrary, if the transmission mode information supplied from the control unit 7 indicates the transmission mode #1, the switch 21 selects a terminal 21b and the switch 24 selects a terminal 24b. The terminal 21b is connected to a coding unit 22b. Therefore, if the transmission mode is of #1, the packet data is supplied from the switch 21 to the coding unit 22b. The coding unit 22b encodes the packet data supplied thereto at the coding rate of $R=\frac{1}{2}$ and the resultant coded data is supplied to a 16QAM modulating unit 23b. The 16QAM modulating unit 23b effects a 16QAM modulation on the coded data supplied from the coding unit 22b and the resultant modulated signal is supplied to the terminal 24b of the switch 24. When the transmission mode is of #1, as described above, the switch 24 selects the terminal 24b. Therefore, the modulated signal outputted from the 16QAM modulating unit 23b is supplied through the switch 24 to the retransmission buffer 12 (FIG. 2).

Further, if the transmission mode information supplied from the control unit 7 indicates the transmission mode #2, the switch 21 selects a terminal 21c and the switch 24 selects a terminal 24c. The terminal 21c is connected to a coding unit 22c. Therefore, if the transmission mode is of #2, the packet data is supplied from the switch 21 to the coding unit 22c. The coding unit 22c encodes the packet data supplied thereto at the coding rate of $R=\frac{3}{4}$ and the resultant coded data is supplied to a 16QAM modulating unit 23c. The 16QAM modulating unit 23c effects a 16QAM modulation on the coded data supplied from the coding unit 22c and the resultant modulated signal is supplied to the terminal 24c of the switch 24. When the transmission mode is of #2, as described above, the switch 24 selects the terminal 24c. Therefore, the modulated signal outputted from the 16QAM modulating unit 23c is supplied through the switch 24 to the retransmission buffer 12 (FIG. 2).

Now back to FIG. 2, the retransmission buffer 12 temporary stores the encoded and modulated user data supplied from the adaptive coding and modulation unit 13, and also supplies to the spreading unit 11. Further when the retransmission buffer 12 receives the retransmission flag from the control unit 7, then supplies the stored user data again to the spreading unit 11 as the retransmission data. In addition, when the retransmission buffer 12 does not receive the retransmission flag from the control unit 7, namely when the user data is normally received by the terminal, the retransmission buffer 12 erases (deletes) the normally received data in the stored user data.

The spreading unit 11 effects the spectrum spreading on the modulated signal supplied from the power adjusting unit 10 and the modulated signal supplied from the retransmission buffer 12 by using different spreading codes, and supplies thus obtained spread signal to the transmission/reception compatible unit 1. The transmission/reception compatible unit 1 effects a necessary processing on the spread signal supplied from the spreading unit 11 and transmits to the terminal as a radio wave from the antenna 14.

In this case, the modulated signal supplied from the power adjusting unit 10 is to be a signal transmitted through the downlink control channel shown in FIG. 1 and the modulated signal supplied from the adaptive coding and modulation unit 13 is to be a signal transmitted through the downlink data channel shown in FIG. 1.

Next, FIG. 5 is a diagram showing an example of an arrangement of a conventional terminal which can realize a communication system employing an adaptive modulation and coding rate (adaptive coding and modulation system).

The terminal (user terminal) is arranged to include a transmission/reception compatible unit 31, an inverse spreading unit 32, a control channel received signal quality estimating unit 33, a power control bit generating unit 34, a data channel received signal quality estimating unit 35, a mode selection unit 36, a control data demodulating and decoding unit 37, a control unit 38, a user data demodulating and decoding unit 39, an error detecting unit 40, a retransmission request message generating unit 41, a retransmission request message inserting unit 42, a mode request message inserting unit 43, a power control bit inserting unit 44, a spreading unit 45, and an antenna 46.

A transmitted signal transmitted from the base station is received by the antenna 46. The received signal is subjected to the necessary processing in the transmission/reception compatible unit 31, and thereafter supplied to the inverse spreading unit 32. The inverse spreading unit 32 effects an inverse spectrum spreading on the signal supplied from the transmission/reception compatible unit 31 so that the signal is divided into a signal for the downlink data channel and a signal for the downlink control channel which are described with reference to FIG. 1. The inverse spreading unit 32 supplies the signal for the downlink control channel to the control channel received signal quality estimating unit 33 and the control data demodulating and decoding unit 37. Further, the inverse spreading unit 32 supplies the signal for the downlink data channel to the data channel received signal quality estimating unit 35 and the user data demodulating and decoding unit 39.

The control channel received signal quality estimating unit 33 estimates a signal to noise ratio (SNR (Signal to Noise Ratio)) based on a pilot signal which derives from time division multiplexing effected in the downlink control channel. That is, although description is not provided with reference to FIG. 2, the spreading unit 11 carries out a time division multiplexing on a predetermined pilot signal with the demodulated signal supplied from the power adjusting unit 10. Thereafter, the spreading unit 11 carries out the spectrum spreading on the signal. Therefore, the signal transmitted through the downlink control channel contains the pilot signal in addition to the modulated signal supplied from the power adjusting unit 10. The control channel received signal quality estimating unit 33 estimates the SNR of the signal supplied from the inverse spreading unit 32 through the downlink control channel by using the pilot signal contained in the signal. Then, the control channel received signal quality estimating unit supplies the estimated SNR to the power control bit generating unit 34.

The power control bit generating unit 34 responds to the estimated SNR of the downlink control channel in such a manner that if the estimated SNR is better than a desired SNR then a power control bit of a value "0" is outputted to the power control bit inserting unit 44 while if the same is worse than the desired value then a power control bit of a value "1" is outputted to the power control bit inserting unit 44. In this case, the SNR estimation in the control channel received signal estimating unit 33 and the power control bit generation in the power control bit generating unit 34 are executed for every slot. Then, the base station described with reference to FIG. 2 controls the transmission power of the downlink control channel based on the power control bit so that the terminal can always receive the signal of the downlink control channel at a constant SNR.

The control data demodulating and decoding unit 37 demodulates and decodes the signal supplied from the inverse spreading unit 32 through the downlink control channel, separates the control data from the signal, and supplies the same to the control unit 38.

The control unit 38 detects the information concerning the coding rate and the modulation system to be applied to the downlink data channel, i.e., the transmission mode information, which is disposed in the control data supplied from the control data demodulating and decoding unit 37. Then, the control unit carries out mode setting (control) for the user data demodulating and decoding unit 39.

That is, as shown in a flowchart of FIG. 6, initially at step S1, the control unit 38 detects the transmission mode from the control data supplied from the control data demodulating and decoding unit 37 and the processing proceeds to step S2. At step S2, the control unit 38 examines whether the modulation system indicated by the transmission mode is the QPSK modulation or not. At step S2, if it is determined that the modulation system indicated by the transmission mode is the QPSK modulation, the processing proceeds to step S3. In this step S3, the control unit 38 demodulates the signal of the downlink data channel based on the QPSK manner, and controls the user data demodulating and decoding unit 39 so that this unit decodes the signal at the coding rate of R=½. Thereafter, the control unit 38 awaits the next control data to be supplied from the control data demodulating and decoding unit 37, and then, the processing returns from step S3 to S1, and the same processing sequence is repeated in a similar manner.

At step S2, if it is determined that the modulation system indicated by the transmission mode is not the QPSK modulation, the processing proceeds to step S4. In this step S4, the control unit 38 examines whether the modulation system indicated by the transmission mode is the 16QAM and the coding rate indicated by the transmission mode is R=½ or not. At step S4, if it is determined that the modulation system indicated by the transmission mode is the 16QAM and the coding rate indicated by the transmission mode is R=½, then the processing proceeds to step S5. In this step S5, the control unit 38 demodulates the signal of the downlink data channel based on the 16QAM manner, and controls the user data demodulating and decoding unit 39 so that this unit decodes the signal at the coding rate of R=½. Thereafter, the control unit 38 awaits the next control data to be supplied from the control data demodulating and decoding unit 37. The processing returns from step S5 to S1, and the same processing sequence is repeated in a similar manner.

At step S4, if it is determined that the transmission mode information does not designate the combination of the modulation system of the 16QAM and the coding rate of R=½, the processing proceeds to step S6. In this step S6, the control unit 38 examines whether the modulation system indicated by the transmission mode is the 16QAM or not and whether the coding rate indicated by the transmission mode is R=¾ or not. At step S6, if it is determined that the modulation system indicated by the transmission mode is the 16QAM and the coding rate indicated by the transmission mode is R=¾, then the processing proceeds to step S7. In this step, the control unit 38 demodulates the signal of the downlink data channel based on the 16QAM manner, and controls the user data demodulating and decoding unit 39 so that this unit decodes the signal at the coding rate of R=¾. Thereafter, the control unit 38 awaits the next control data to be supplied from the control data demodulating and decoding unit 37, and then, the processing returns from step S7 to S1, and the same processing sequence is repeated in a similar manner.

At step S6, if it is determined that the transmission mode information does not designate the combination of the modulation system of the 16QAM and the coding rate of R=¾, this determination means that the transmission mode information does not designate the above mentioned three combinations of the modulation system and the coding rate. In this event, the control unit 38 determines that the transmission mode is erroneous one, and hence the control unit takes no particular action in controlling the user data demodulating and decoding unit 39. Thus, the control unit 38 awaits the next control data to be supplied from the control data demodulating and decoding unit 37, and the processing returns from step S6 to S1, and the same processing sequence is repeated in a similar manner.

Now description will be again made with reference to FIG. 5. The data channel received signal quality estimating unit 35 estimates the SNR of the signal of the downlink data channel supplied from the inverse spreading unit 32. When the data channel received signal quality estimating unit 35 estimates the SNR, the data channel received signal quality estimating unit 35 utilizes a pilot symbol subjected to the time division multiplexing on the downlink data channel or a pilot channel symbol transmitted together with the downlink data channel in a parallel manner.

Although description is not provided yet with reference to FIG. 2, the spreading unit 11 effects the time division multiplexing on the predetermined pilot signal with the demodulated signal supplied from the adaptive coding and modulation unit 13. Thereafter, the spreading unit 11 carries out the spectrum spreading. Therefore, the signal of the downlink data channel contains the pilot signal. Further, the spreading unit 11 effects the spectrum spreading on another pilot signal with a spreading code different from a spreading code which is utilized for the effecting spectrum spreading on the demodulated signal supplied from the power adjusting unit 10 or the adaptive coding and modulation unit 13. Then, the pilot signal is supplied through the transmission/reception compatible unit 1 to the antenna 14 from which the pilot signal is transmitted through the downlink data channel and the downlink control channel in parallel.

The data channel received signal quality estimating unit 35 estimates the SNR of the signal of the downlink data channel supplied from the inverse spreading unit 32 by using the pilot signal contained in the signal or the pilot signal transmitted in parallel together with the signal of the downlink data channel. Then, the estimated SNR is supplied to the mode selection unit 36.

The mode selection unit 36 recognizes the estimated SNR of the downlink data channel supplied from the data channel received signal quality estimating unit 35 as the received signal quality at the terminal, and determines (selects) the combination, namely the transmission mode, of the coding rate and modulation system capable of setting the error rate of the user data to be equal or less than the predetermined value relative to the received signal quality. Further, the mode selection unit 36 generates a mode request message indicating its transmission mode as to request thus determined transmission mode to the base station, and supplies to the mode request message inserting unit 43.

In this case, the data channel received signal quality estimating unit 35 estimates the SNR of the downlink data channel for each frame, and the mode selection unit 36 generates the mode request message also at every frame.

In this case, if it is estimated that the noise level of the transmission path is small, accordingly, the transmission path is better (when the received signal quality is better) based on the received signal quality supplied from the data channel received signal quality estimating unit 35, the mode selection unit 36 selects the transmission mode combining the coding rate and the modulation system which are able to handle higher transmission rate data. Conversely, if it is estimated that the noise level of the transmission path is high and, accordingly the transmission path is bad (when the received signal quality is extremely bad), the transmission mode combining the coding rate and the modulation system which are able to suppress the rate of the data transmission and to strengthen the error correction.

More specifically, the mode selection unit 36, as shown in FIG. 7, for example, selects the transmission mode capable of setting the error rate of the user data to be equal or less than the predetermined value.

Namely, FIG. 7 shows a relation between the received signal quality and the error rate of the user data (FER: Frame Error Rate) with respect to above mentioned respective three transmission modes #0 (R=½, QPSK), #1 (R=½, 16QAM), and #2 (R=¾, 16QAM). The mode selection unit 36, for example, selects the transmission mode capable of setting the error rate (FER) of the user data to be equal or less than 10% relative to the received signal quality. In this case, according to FIG. 7, the mode selection unit 36 selects the transmission modes #0 (R=½, QPSK), #1 (R=½, 16QAM), or #2 (R=¾, 16QAM), respectively in case when the received signal quality is below −8 db, larger than −8 db and smaller than −4 db, or more than −4 db.

On the other hand, the user data demodulating and decoding unit 39 carries out decoding and demodulation on the signal of the downlink data channel supplied from the inverse spreading unit 32 under the control of the control unit 38 which is described with reference to FIG. 6. The resultant user data obtained by the operation is supplied to the error detecting unit 40. When the user data demodulating and decoding unit 39 decodes the signal of the downlink data channel, the user data demodulating and decoding unit 39 carries out user data error correction by using the error correction code contained in the signal as a redundancy bit.

The error detecting unit 40 carries out a parity detection by using Cyclic Redundancy Check (CRC), for example. That is, the error detecting unit 40 examines whether the user data decoded by the user data demodulating and decoding unit 39 contains error or not, and the error detecting unit 40 supplies the result of the examination to the retransmission request message generating unit 41.

If the retransmission request message generating unit 41 receives an examination result indicating that there is no error contained therein from the error detecting unit 40, then the retransmission request message generating unit 41 generates a message having a value of "0", for example, and supplies the message to the retransmission request message inserting unit 42. Conversely, if the retransmission request message generating unit 41 receives an examination result indicating that there is some error contained therein from the error detecting unit 40, then the retransmission request message generating unit 41 generates a message having a value of "1", for example, and supplies the message to the retransmission request message inserting unit 42.

The retransmission request message inserting unit 42 carries out framing on the retransmission request message supplied from the retransmission request message generating unit 41 with the signal of the uplink control channel described with reference to FIG. 1, and supplies the resultant signal to the mode request message inserting unit 43. The mode request message inserting unit 43 carries out framing on the mode request message supplied from the mode selection unit 36 with the signal of the uplink control channel supplied from the retransmission request message inserting unit 42. The resultant signal is supplied to the power control bit inserting unit 44. The power control bit inserting unit 44 carries out framing on the power control bit supplied from the power control bit generating unit 34 with the signal of the uplink control channel supplied from the mode request message inserting unit 43. The resultant signal is supplied to the spreading unit 45. The spreading unit 45 effects the spectrum spreading on the signal of the uplink control channel transmitted from the power control bit inserting unit 44, and supplies the resultant signal obtained by the operation to the transmission/reception compatible unit 31. The transmission/reception compatible unit 31 effects a necessary processing on the spread signal transmitted from the spreading unit 45 and transmits the signal through the antenna 47.

As described above, according to the adaptive coding and modulation system, the terminal informs (requests) a desirable combination (transmission mode) of the modulation system and coding rate to the base station based on the received signal quality, then the base station is able to select the combination of the modulation system and the coding system to be actually assigned based on this, so that it becomes possible to change the data transmission speed based on the receiving condition (received signal quality) at the terminal, and accordingly the data can be transmitted to the terminal more effectively.

However, it is impossible for the terminal to determine when the user data is transmitted, so that it is necessary to always transmit a mode request message to the base station. The uplink wireless resources are employed when the mode request message is transmitted to the base station, so that interferences become huge when there are a lot of terminals. Further, in the base station, the transmission of mode request massage from the terminal to the base station, although there is no data to be transmitted to the terminal, causes useless power consumption in the terminal.

DISCLOSURE OF THE INVENTION

The present invention is made in view of the above aspect. Therefore, it is an object of the present invention to propose a solution in which unnecessary transmission of the mode request message and the like is suppressed, and saving of the uplink radio resources is realized.

A transmission apparatus of the present invention is characterized by including, determination means for determining a possibility of transmitting data to a receiving apparatus, and transmission means for transmitting a possibility information indicating a possibility of transmitting the data to the receiving apparatus and frequency information designating a transmission frequency to the receiving apparatus.

A method for controlling transmission of the present invention is characterized by including a determination step for determining a possibility of transmitting data to a receiving apparatus, and a transmission control step for transmitting a possibility information indicating a possibility of transmitting the data to the receiving apparatus and frequency information designating a transmission frequency to the receiving apparatus.

A first program of the present invention is characterized by including a determination step for determining a possibility of transmitting data to a receiving apparatus, and a transmission control step for transmitting a possibility information indicating a possibility of transmitting the data to the receiving apparatus and frequency information designating a transmission frequency to the receiving apparatus.

A receiving apparatus of the present invention is characterized by including generating means for generating a predetermined information for determining a coding rate and a modulation system at a transmitting apparatus, setting means for setting a transmission frequency of a predetermined information based on a possibility information indicating a possibility of transmitting data from the transmitting apparatus, and transmitting means for transmitting the predetermined information to the transmitting apparatus at the transmission frequency set by the setting means.

A method for controlling reception of the present invention is characterized by including a generating step for generating a predetermined information for determining a coding rate and a modulation system at a transmitting apparatus, a setting step for setting a transmission frequency of a predetermined information based on a possibility information indicating a possibility of transmitting data from the transmitting apparatus, and a transmitting step for transmitting the predetermined information to the transmitting apparatus at the transmission frequency set by the setting means.

A second program of the present invention is characterized by including a generating step for generating a predetermined information for determining a coding rate and a modulation system at a transmitting apparatus, a setting step for setting a transmission frequency of a predetermined information based on a possibility information indicating a possibility of transmitting data from the transmitting apparatus, and a transmitting step for transmitting the predetermined information to the transmitting apparatus at the transmission frequency set by the setting means.

A communication system of the present invention is characterized by including determining means for determining a possibility of transmitting data to a receiving apparatus, a first transmitting means for transmitting a possibility information indicating a possibility of transmitting the data to the receiving apparatus to the receiving apparatus, generating means for generating a predetermined information for determining a coding rate and a modulation system at a transmitting apparatus, setting means for setting a transmission frequency for the predetermined information based on the possibility information transmitted from the transmitting apparatus, and a second transmitting means for transmitting the predetermined information to the transmitting apparatus at the transmission frequency set by the setting means.

In a transmitting apparatus, a method for controlling transmission, and a first program, a possibility of transmitting data to a receiving apparatus is determined, and a possibility information indicating a possibility of transmitting the data to the receiving apparatus and a frequency information designating transmission frequency for a predetermined information are transmitted.

In a receiving apparatus, a method for controlling reception, and a second program, a predetermined information for determining a coding rate and a modulation system at a transmitting apparatus is generated, and a transmission frequency for the predetermined information is set. And, the predetermined information is transmitted to the transmitting apparatus at the set transmission frequency.

In a communication system of the present invention, a possibility of transmitting data to a receiving apparatus is determined, and a possibility information indicating a possibility of transmitting data to the receiving apparatus is transmitted to the receiving apparatus. Further, a predetermined information for determining a coding rate and a modulation system at a transmitting apparatus is generated, and a transmission frequency for the predetermined information is set based on the possibility information transmitted from the transmitting apparatus. Accordingly, the predetermined information is transmitted to the transmitting apparatus at the set transmission frequency.

BRIEF DESCRIPTION OF THE DRAWINGS

FIG. 1 is a diagram for explaining a conventional manner of data transmission;

FIG. 2 is a block diagram showing one example of an arrangement of a conventional base station;

FIG. 4 is a block diagram showing an example of an arrangement of an adaptive coding and modulation unit 13;

FIG. 5 is a block diagram showing one example of an arrangement of a conventional terminal;

FIG. 6 is a flowchart for explaining a data receiving processing at a control unit;

BEST MODE FOR CARRYING OUT THE INVENTION

Figure 3A:
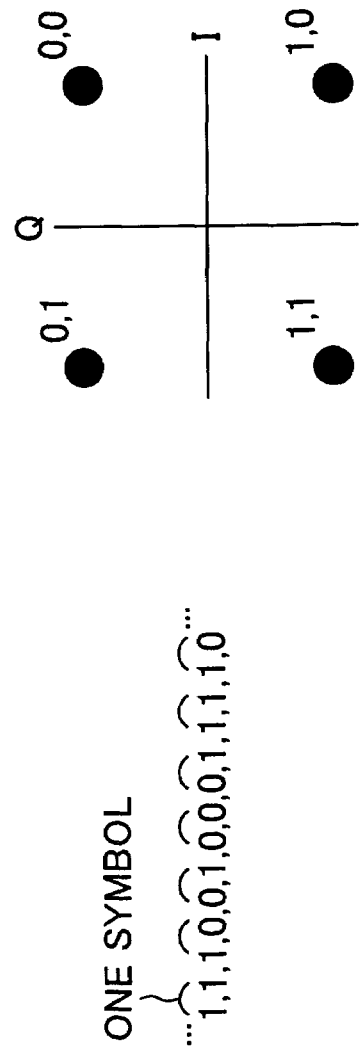
FIG. 3A is a diagram illustrating the mapping of the data in accordance with a QPSK modulation system.
Figure 3B:
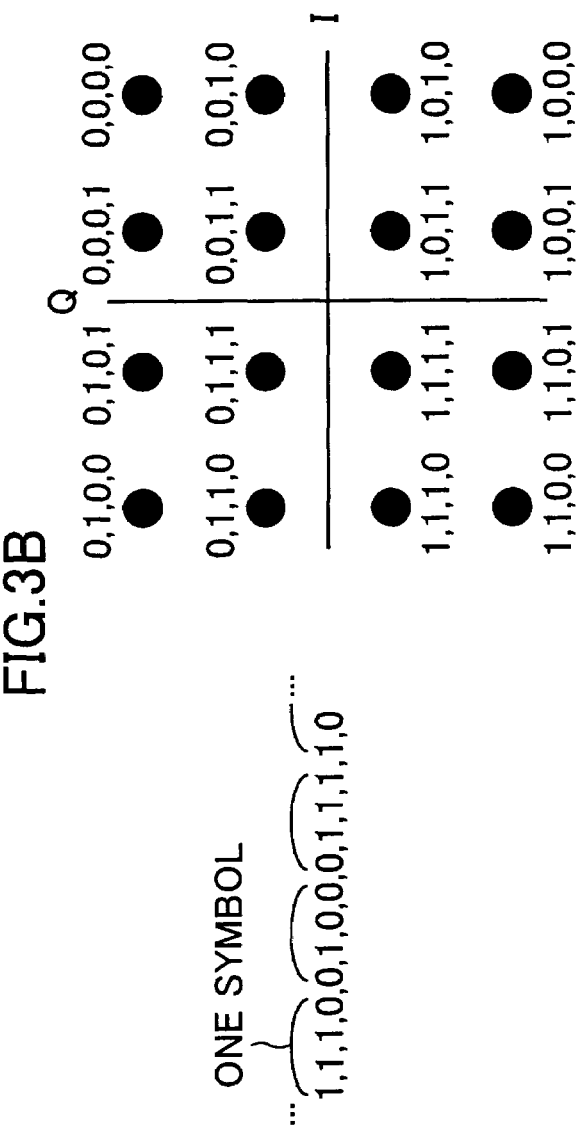
FIG. 3B is a diagram illustrating the mapping of the data in accordance with a 16QAM modulation system.
Figure 7:
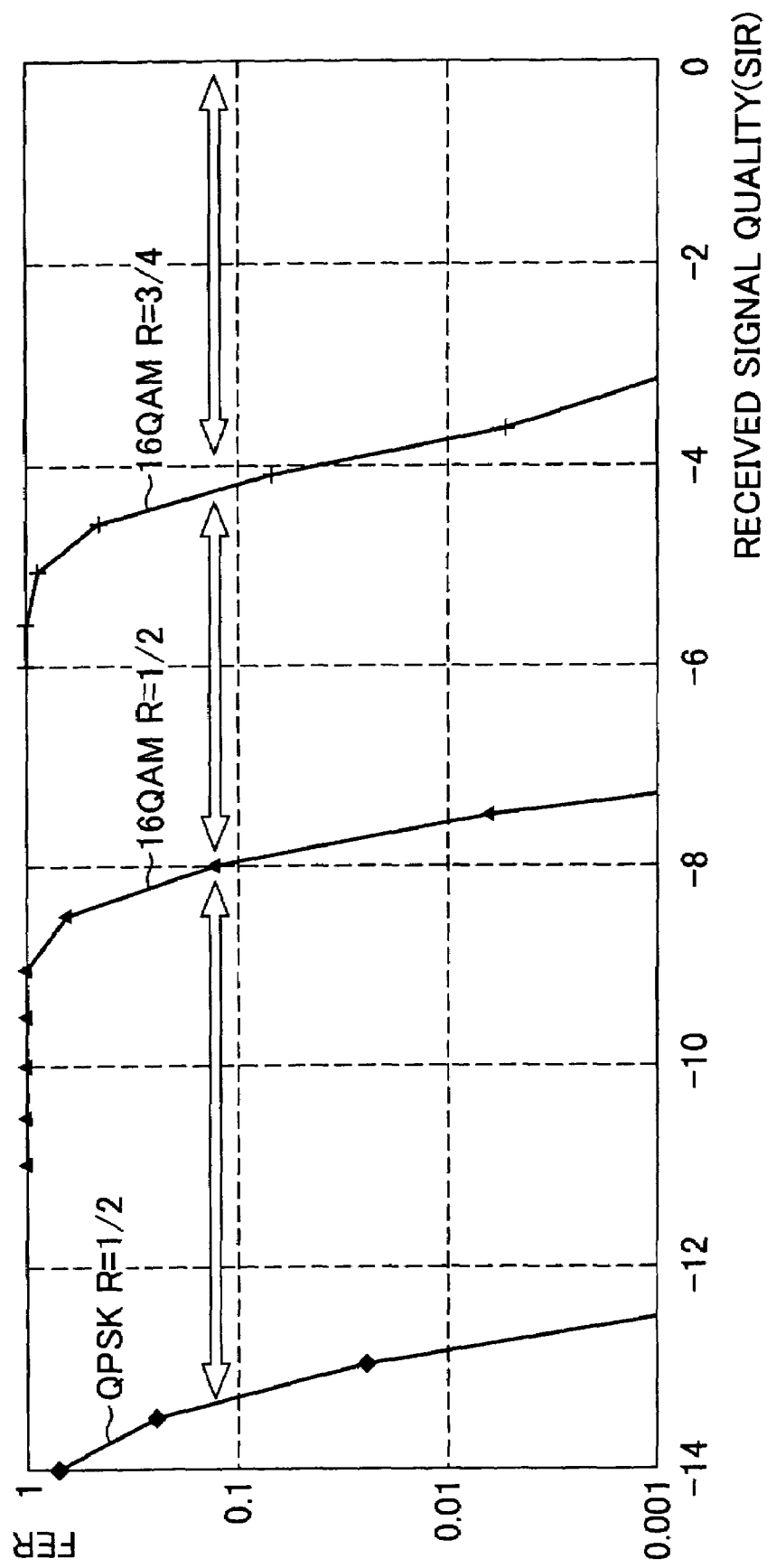
FIG. 7 is a chart showing a relation between the received signal quality and the error rate.
Figure 8:
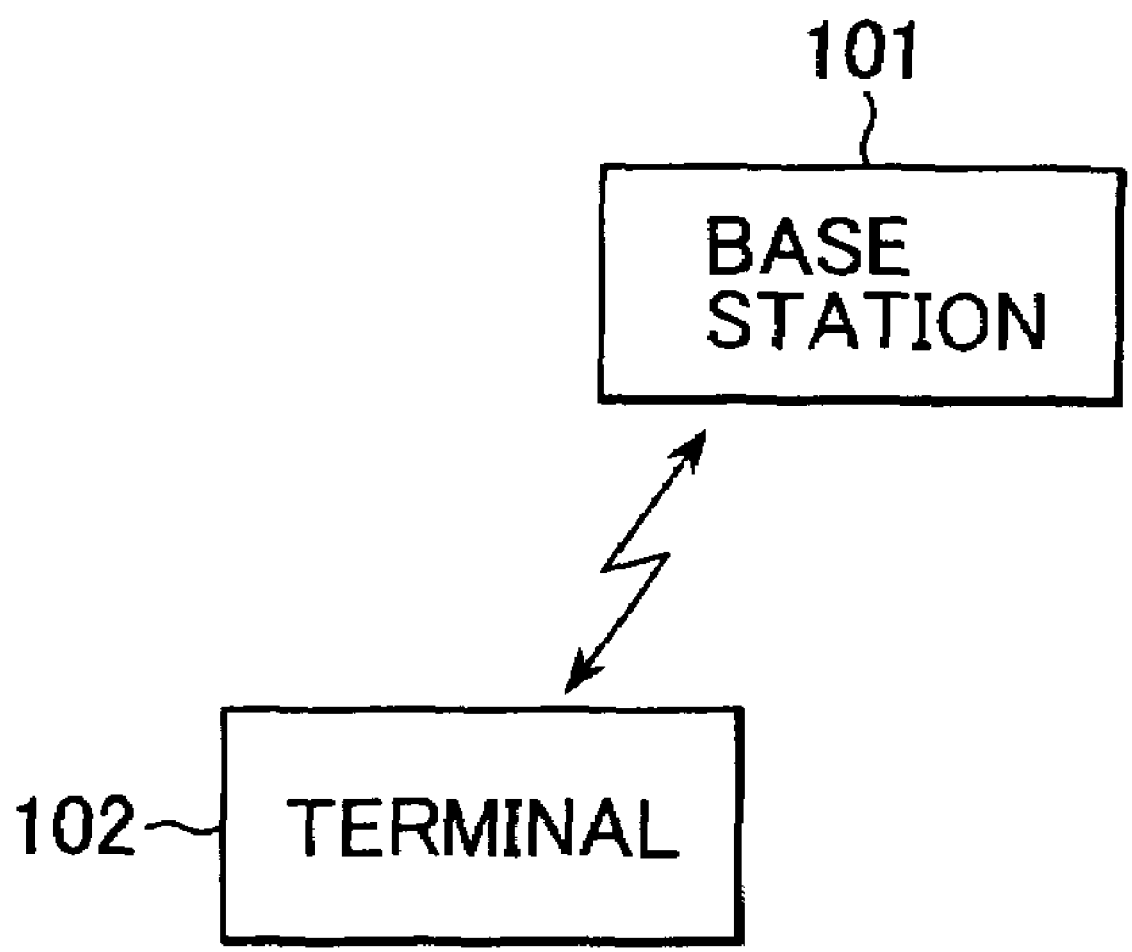
FIG. 8 is a block diagram showing one example of a transmission system to which the present invention is applied.

FIG. 8 is a diagram showing an example of an arrangement of one embodiment of a communication system (the system means a thing formed by gathering a plurality of apparatuses, and it is not concerned whether each construction of apparatuses are included in a housing or not.) to which the present invention is applied.

The communication system in FIG. 8 comprises of a base station 101 and a terminal 102 such as a mobile telephone or the like, for example, and data is to be communicated between the base station 101 and the terminal 102 by radio communications.

In this case, in the mode of the embodiment in FIG. 8, only each one of the base station 101 and the terminal 102 is respectively depicted, but the communication system is possible to be constructed with a plurality of base stations and terminals.

Figure 9:
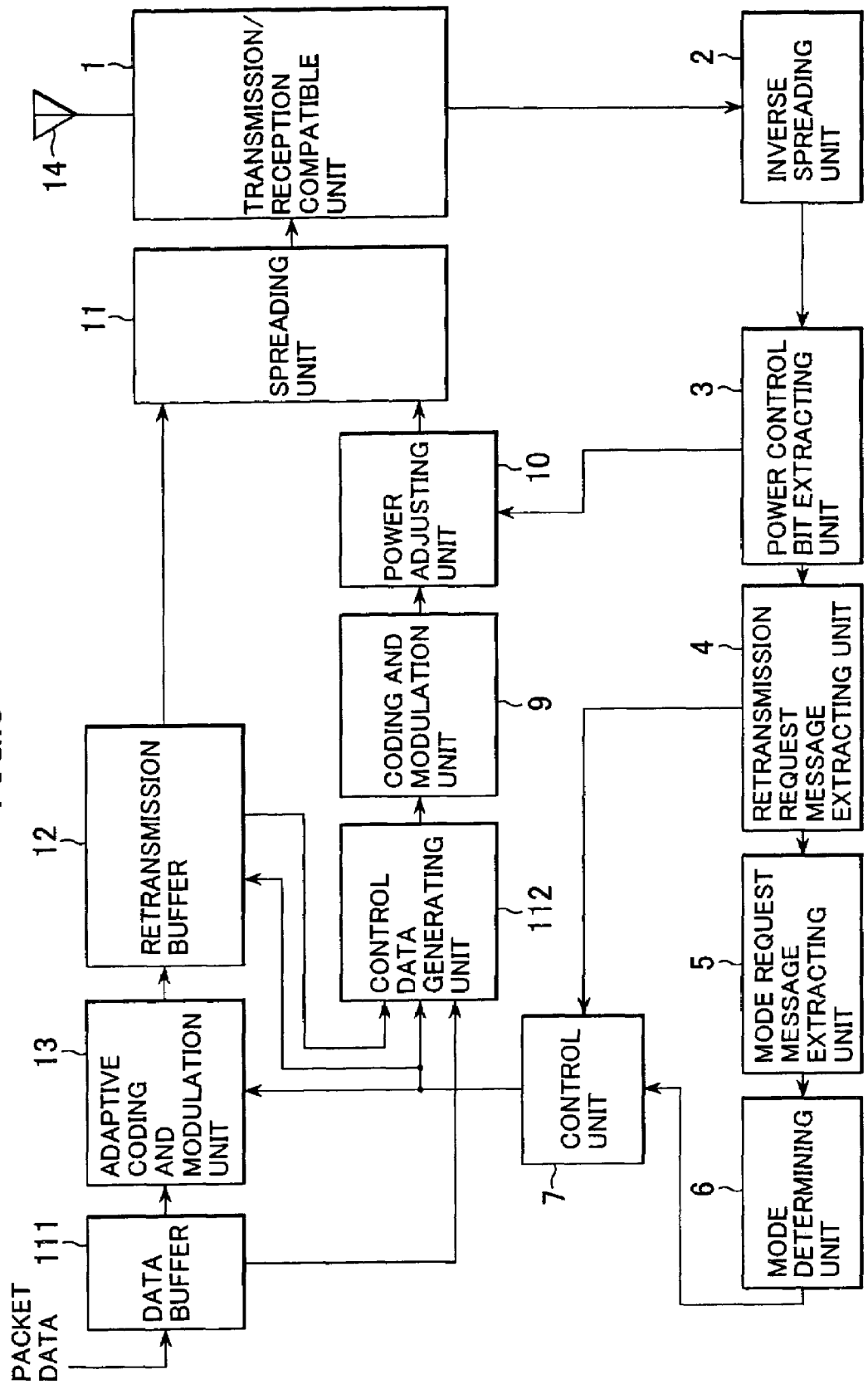
FIG. 9 is a block diagram showing one example of the base station 101.

FIG. 9 shows one constructive example of the base station 101 in FIG. 8. In this case, in this figure, the portions corresponding to them in FIG. 2 are assigned the same references, and here-in-after, their explanations are omitted here by case.

As shown in FIG. 9, the base station is arranged to include a transmission/reception compatible unit 1, an inverse spreading unit 2, a power control bit extracting unit 3, a retransmission request message extracting unit 4, a mode request message extracting unit 5, a mode determining unit 6, a control unit 7, a coding and modulation unit 9, a power adjusting unit 10, a spreading unit 11, a retransmission buffer 12, an adaptive coding and modulation unit 13, a data buffer 111, and a control data generating unit 112.

Accordingly, the base station shown in FIG. 9 is newly provided with the data buffer 111, and further the control data generating unit 112 is also provided instead of the control data generating unit 8. Other portions are basically constructed as the base station in FIG. 2.

In this case, in the mode of the embodiment in FIG. 9, the data buffer 111 and the retransmission buffer 112 are depicted one in each, but the data buffer 111 and the retransmission buffer 112 are prepared to each of user who is registered to the base station 101. Namely, the base station 101 handles, for example, communications among terminals existed at an area (cell) within a range of a predetermined distance, but the data buffer 111 and the retransmission buffer 112 are prepared per each terminal that is handled by the corresponding base station 101.

The data buffer 111 temporally stores packet data to which the user data is allocated and which is to be inputted to the base station 101, and supplies to the adaptive coding and modulation unit 13 when it is necessary.

The control data generating unit 112 operates to include a data indicator bit to conventional control data, and transmits.

Namely, the control data generating unit 112 determines possibility of transmission of data to the terminal 102, and supplies the data indicator bit (here-in-after, simply referred to as an indicator) by including in the control data to the adaptive coding and modulation unit 9.

More specifically, the control data generating unit 112 watches the data buffer 111 and the retransmission buffer 12, and if the data addressed to the terminal 102 is stored in either the data buffer 111 or the retransmission buffer 12, then generates the indicator indicating the possibility of transmission of data to the terminal 102, namely the indicator having a value of "1", for example, and includes in the control data. Further, if the data addressed to the terminal 102 is not stored in neither the data buffer 111 nor the retransmission buffer 12, then the control data generating unit 112 generates the indicator indicating the possibility of transmission of data to the terminal 102, namely the value of the indicator having a value of "0", for example, and includes in the control data.

Further, in the above identified case, simply if the data addressed to the terminal 102 is stored in either the data buffer 111 or the retransmission buffer 12, then the indicator having a value of "1" is generated as the fact that there is a possibility of transmission of data to the terminal 102. But setting the indicator to be "1", namely the possibility of the transmission of data to the to the terminal 102 is able to be determined by considering whether the user data is not assigned to the terminal 102 within a predetermined time or not (the user data addressed to the terminal 102 stored in either data buffer 111 or the retransmission buffer 12 are not transmitted more than predetermined interval), or whether more than predetermined bits of the user data addressed to the terminal 102 are existed either in the data buffer 111 or the retransmission buffer 12 or not, in addition to the existence of the data in the data buffer 111 and the retransmission buffer 12.

Further as will be described later, when a transmission cycle M is not M=∞, but a certain finite value, namely when the mode request message is transmitted from the terminal 102 back to the base station 101 at every M frames, it is able to set the indicator to be "1" provided that a mean received signal quality at the terminal 102 exceeds a predetermined threshold value.

Namely, the case where the indicator is "1" means that here is a possibility of transmission of data to the terminal 102 now.

On the contrary, the base station 101 assigns radio resources to the terminal 102 and, in addition, a lot of terminals including other terminals (not shown), and after that, transmits data addressed to these terminals. Accordingly, although the user data addressed to the terminal 102 are existed either in the data buffer 111 or retransmission buffer 12, the user data is not always transmitted immediately to the terminal 102.

Namely, the base station 101 assigns the radio resources to each terminal based on, for example, the data amount of the user data for each terminal stored in either the data buffer 111 or the retransmission buffer 12, or how long the user data for each terminal stored in either the data buffer 111 or the retransmission buffer 12 is stored without any transmission, or further based on the mean received signal quality or the like at each terminal.

Specifically, the base station 101 preferentially assigns, for example, the radio resources to the terminal having more data amount of the user data stored in either the data buffer 111 or the retransmission buffer 12. Further the base station 101 preferentially assigns the radio resources to the terminal that stores longer the user data stored in either the data buffer 111 or the retransmission buffer 12 stored without any transmission. Further, the base station 101 preferentially assigns the radio resources to the terminal that has higher mean received signal quality.

Accordingly, the user data addressed to the terminal 102 is preferentially transmitted based on not only the fact that the user data addressed to the terminal 102 is stored in either the data buffer 111 or the retransmission buffer 12 but also the fact that its amount of the data is large, or its user data is not transmitted for a long time, and further the fact that the mean received signal quality at the terminal 102 is high, so that it is probable that the data is to be transmitted to the terminal 102, now.

Then, when the user data addressed to the terminal 102 is stored either in the data buffer 111 or the retransmission buffer 12 and further its data amount is large, when its user data is not transmitted for a long time, or the mean received signal quality is high, it is able to set the value of the indicator to be "1" indicating that there is a possibility of transmitting the data to the terminal 102.

In addition, the mean received signal quality at the terminal 102 is, for example, able to be obtained from the mode request message to be extracted at the mode request message extracting unit 6. Namely, the transmission mode indicated by the mode request message is determined at the terminal 102 based on the received signal quality at the terminal 102 similar to the case explained in FIG. 5. Namely, based on the transmission mode indicated by the mode request message, it is possible to estimate the received signal quality, and accordingly, it is able to obtain the mean received signal quality at the terminal 102 based on thus estimated received signal quality.

The control data generating unit 112 determines the possibility of transmitting the data to the terminal 102 as described above, includes the indicator indicating the possibility into the control data, and further generates frequency information designating transmission frequency of the mode request message from the terminal 102, and includes in the control data.

Namely, the control data generating unit 112 sets the transmission frequency so that the transmission cycle becomes at every K frames, for example, in the case where the indicator is "1", and there is a possibility of transmitting data to the terminal 102, and further sets the transmission frequency so that the transmission cycle becomes at every M frames where M is larger than K, for example, in the case where the indicator is 0, and there is no possibility of transmitting data to the terminal 102. Namely, control data generating unit 112 sets a lower transmission frequency when the indicator is "0" than when the indicator is "1" if the transmission frequency when the indicator is "1" is taken as a reference.

More specifically, the control data generating unit 112 adaptively sets (controls) respective transmission frequency in the cases of indicator to be "0" or "1", based on the traffic of the transmission path, namely the number of the terminals registered to the base station 101.

In this case, if the frequency information represents, for example, the transmission cycle transmitted by allocating the mode request message in the frame, then it is possible to set its value to be a finite value, but it is also possible to set the transmission cycle in the case where the indicator is "0" to be infinite value. In this case, the terminal 102 does not transmit the mode request message to the base station 101.

Further, the transmission cycle in the case where the indicator is "1" is possibly set to be "1", for example. The mode request message is to be transmitted at every one frame from the terminal 102 to the base station 101.

In this case, in the above case, it is possible to set the frequency information K in the case where the indicator is "1", and the frequency information M in the case of the indicator is "0" to be any value in the control data generating unit 112. On the contrary, the frequency information K or M is able to be previously determined to a fixed value corresponding to respective indicator having value of "1" or "0". As described above, when the frequency information K and M is previously determined, it is not necessary to include the frequency information K and M in the control data together with the indicator.

Namely, in the case where the frequency information K or M is previously determined corresponding to respective indicator having a value of "1" or "0", the transmission frequency of the mode request message is to be uniquely determined by the value of the indicator. Accordingly, in this case, the frequency information K and M are to be equivalently included in the control data by including the indicator, even if the frequency information K and M is not included.

Figure 10:
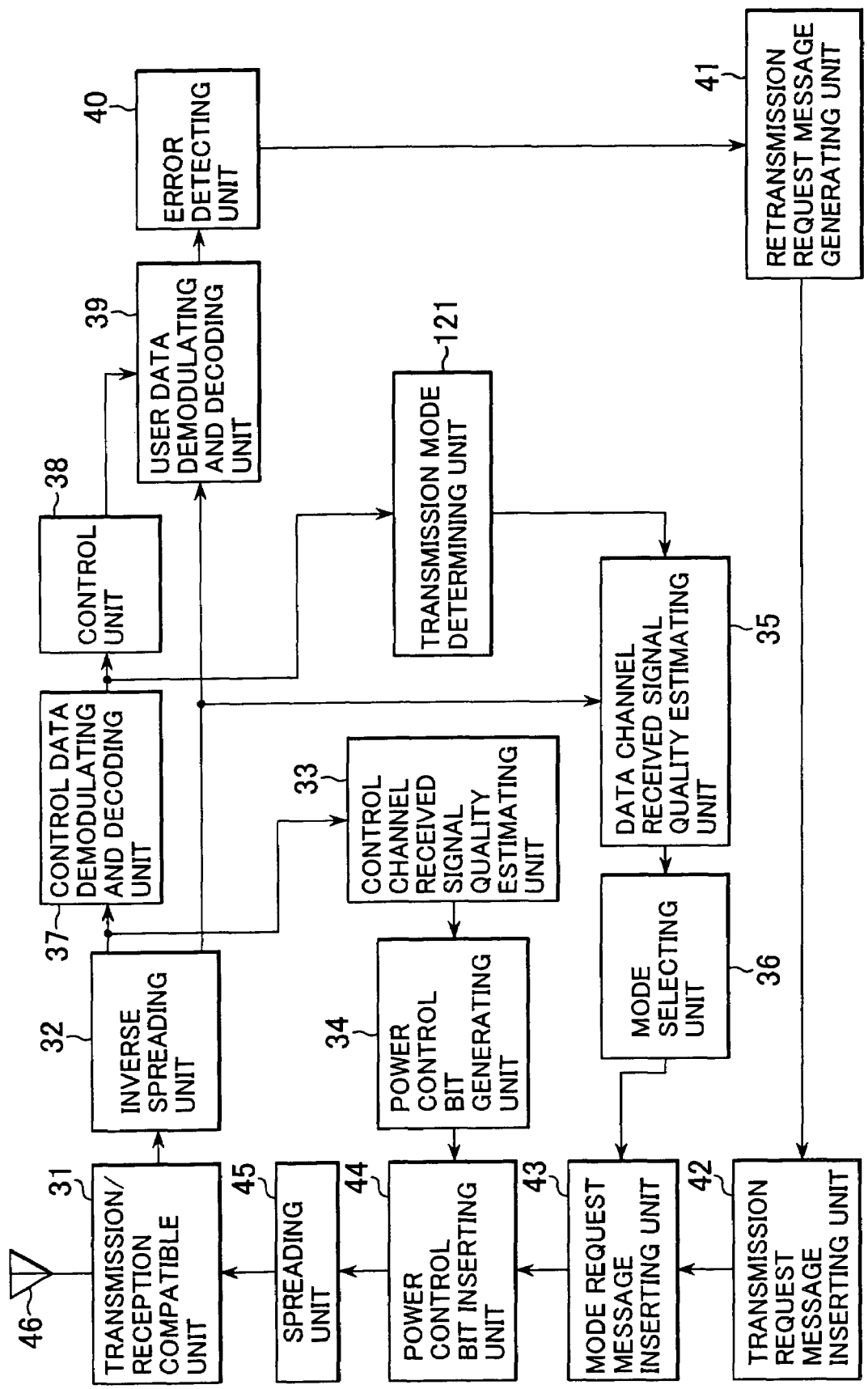
FIG. 10 is a block diagram showing one example of the terminal 102.

Next, FIG. 10 shows one constructive example of the terminal 102 in FIG. 8. In this case, in this figure, the parts corresponding parts in FIG. 5 are assigned the same references and here-in-after the these explanations are omitted, accordingly.

As shown in FIG. 10, the terminal (user terminal) is arranged to include a transmission/reception compatible unit 31, an inverse spreading unit 32, a control channel received signal quality estimating unit 33, a power control bit generating unit 34, a data channel received signal quality estimating unit 35, a mode selection unit 36, a control data demodulation and decoding unit 37, a control unit 38, a user data demodulation and decoding unit 39, an error detecting unit 40, a retransmission message generating unit 41, a retransmission request message inserting unit 42, a mode request message inserting unit 42, a power control bit inserting unit 44, a spreading unit 45, an antenna 46, and a transmission mode determining unit 121.

Accordingly, the terminal 102 shown in FIG. 9 is newly provided with the transmission mode determining unit 121, and other portions are basically constructed as the terminal in FIG. 5.

The control data demodulated and decoded at the control data demodulation and decoding unit 37 is supplied to the transmission mode determining unit 121. The transmission mode determining unit 121 controls the operation of the data channel received signal quality estimating unit 35 based on the indicator and the frequency information included in the control data.

Namely, suppose that the frequency information indicates that the transmission frequency is set to be every M or K frames when the indicator is "0" and when the indicator is "0", then the transmission mode determining unit 121 controls the data channel received signal quality estimating unit 35 as to estimate the received signal quality of the downlink data channel at every M frames when the indicator included in the control data is "0", and further, controls the data channel received signal quality estimating unit 35 as to estimate the received signal quality of the downlink data channel at every K (<M) frames when the indicator included in the control data is "1".

In this case, when the received signal quality is supplied from the data channel received signal quality estimating unit 35, the mode selection unit 36 determines the transmission mode based on its received signal quality, and supplies to the mode request message inserting unit 43. Accordingly, when the data channel received signal quality estimating unit 35 is controlled as to estimate the received signal quality at every M or K frames, the transmission mode is to be transmitted at the terminal 102 at every M or K frames in the terminal 102.

In this case, as above described, when the frequency information K or M is previously determined with reference to the indicator having a value of "1" or "0", the transmission mode determining unit 121 determines uniquely the frequency information K or M by the value of the indicator included in the control data, and controls the data channel received signal quality estimating unit 35.

Figure 11:
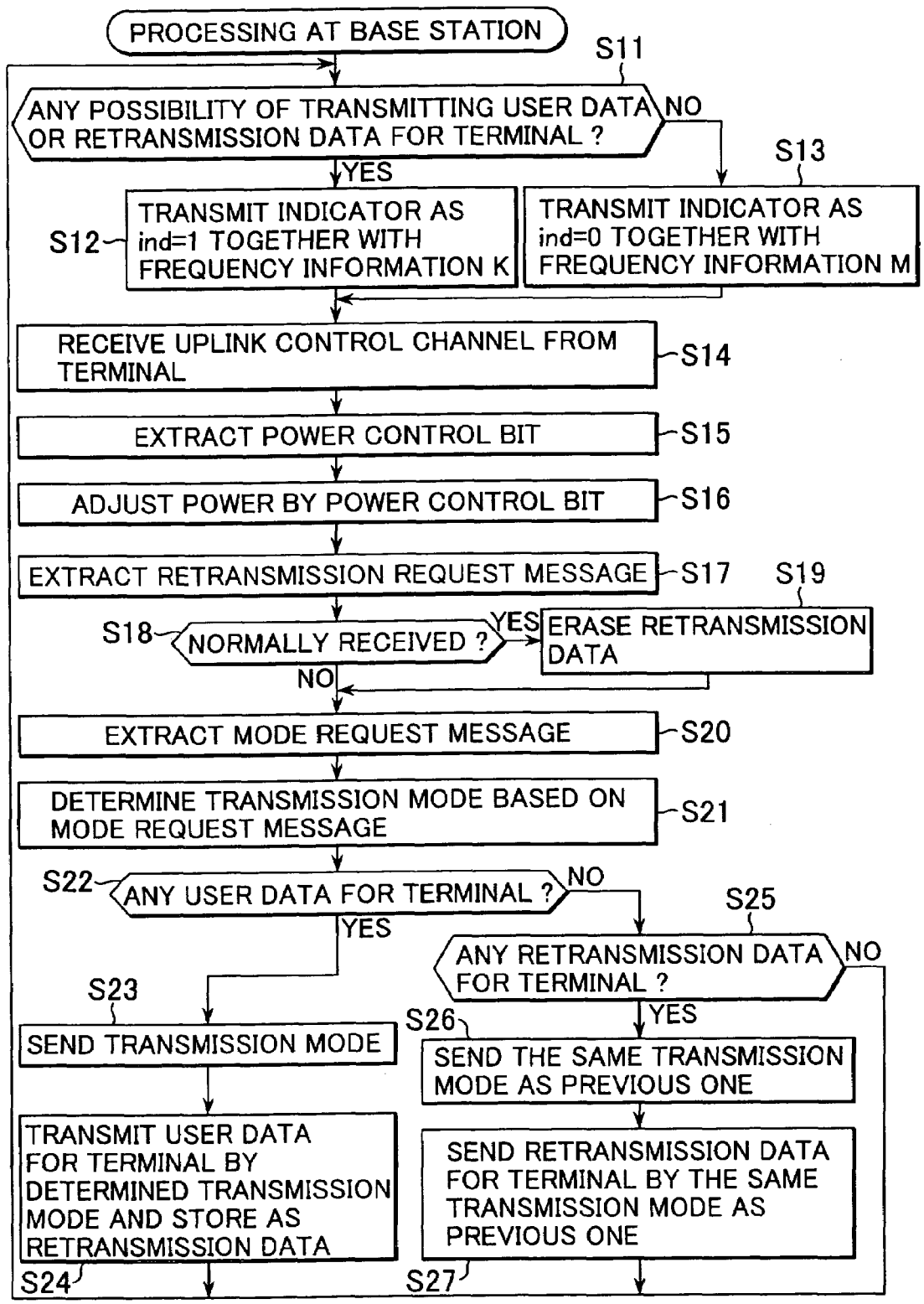
FIG. 11 is a flowchart showing a processing at the base station 101.

Next, a processing of the base station 101 in FIG. 9 is explained with reference to a flowchart in FIG. 11.

At first, at step S11, the control data generating unit 112 determines whether there is a possibility of transmitting either the user data or the retransmission data for the terminal 102 or not with reference to the data buffer 111 and the retransmission buffer 12, for example.

At step S11, if it is determined that there is a possibility of transmitting the user data or the retransmission data for the terminal 102, the processing proceeds to step S12, and a variable ind designating the indicator is set to be "1", and is transmitted together with the frequency information K indicating the transmission frequency of the mode request message in case that the indicator is "1", then the processing proceeds to step S14.

Namely, at step S12, the control data generating unit 112 generates the control data including the indicator ind having the value of "1" and the frequency information. This control data is supplied from the control data generating unit 112 through the coding and modulation unit 9, the power adjusting unit 10, the spreading unit 11, and the transmission/reception compatible unit 1 to the antenna 14, and is transmitted as the signal of the downlink control channel.

On the other hand, at step S12, if it is determined that there is no possibility of transmitting the user data or the retransmission data for the terminal 102, the processing proceeds to step S13, and the variable ind designating the indicator is set to be "0", and is transmitted together with the frequency information K indicating the transmission frequency of the mode request message in case that the indicator ind is "0", then the processing proceeds to step S14.

Namely, at step S13, the control data generating unit 112 generates the control data including the indicator ind having the value of "0" and the frequency information M. This control data is supplied from the control data generating unit 112 through the coding and modulation unit 9, the power adjusting unit 10, the spreading unit 11, and the transmission/reception compatible unit 1 to the antenna 14, and is transmitted as the signal of the downlink control channel.

At step S14, the signal of the uplink control channel transmitted from the terminal 102 is received.

Namely, the signal of the uplink control channel transmitted from the terminal 102 is received at the antenna 14, and supplied trough the transmission/reception compatible unit 1 and inverse spreading unit 2 to the power control bit extracting unit 3.

Then, the processing proceeds to step S15, the power control bit extracting unit 3 extracts a power control bit from the signal of the uplink control channel supplied thereto, supplies the power control bit to the power adjusting unit 10, and further supplies the signal of the uplink control channel to the retransmission request message extracting unit 4, then the processing proceeds to step S16.

At step S16, the power adjusting unit 10 adjusts the transmission power of the downlink control channel in response to the power control bit from the power control bit extracting unit 3, and the processing proceeds to step S17. At step S17, the retransmission request message extracting unit 4 extracts the retransmission request message from the signal from the uplink control channel supplied thereto, supplies the retransmission request message to the control unit 7, and further supplies the signal of the uplink control channel to the mode request message extracting unit 5.

Then, the processing proceeds to step S18, and the control unit 7 determines whether the terminal 102 is able to normally receive the user data based on the retransmission request message supplied from the retransmission request message extracting unit 4. At step S18, if it is determined that the terminal 102 is able to normally receive the user data, namely, the retransmission request message is not a request for retransmission, but a request for transmitting new data, the processing proceeds to step S19, and the control unit 7 erases the user data normally received at the terminal 102 among the retransmission data stored therein by controlling the retransmission buffer 12, then the processing proceeds to step S20.

In case when, at step S18, it is determined that terminal 102 is not able to normally receive the user data, namely, the retransmission request message is a request for retransmission, the control unit 7 recognizes the user data which is requested the retransmission, then the processing proceeds to step S20 while skipping the step S19. Accordingly, in this case, the retransmission buffer 12 remains in a condition where the retransmission data corresponding to the user data that is requested the retransmission are stored.

At step S20, the mode request message extracting unit 5 extracts the mode request message form the signal of the uplink control channel supplied from the retransmission request message extracting unit 4, and supplies to the mode determining unit 6, then the processing proceeds to step S21.

At step S21, the mode determining unit 6 determines the coding rate and the modulation system (transmission mode) at the adaptive coding and modulation unit 13 based on the transmission mode requested from the terminal 102 and represented by the mode request message supplied from the mode request message extracting unit 5 and the radio resources owned by the base station 101. Further, at step S16, the mode determining unit 6 supplies the determined transmission mode to the control unit 7, then the processing proceeds to step S22.

At step S22, the control unit 7 determines whether the user data addressed to the terminal 102 is stored in the data buffer 111 or not. At step S22, if it is determined that the user data addressed to the terminal 102 is stored in the data buffer 111, then the processing proceeds to step S23, and the control unit 7 supplies the transmission mode supplied from the mode determining unit 6 at previous step to the control data generating unit 8, and the control data generating unit 8 generates the control data including its transmission mode. This control data is supplied from the control data generating unit 8 through the coding and modulation unit 9, the power adjusting unit 10, the spreading unit 11, and the transmission/reception compatible unit 1 to the antenna 14, and is transmitted as the signal of the downlink control channel.

After that, the processing proceeds to step S24, the user data for the terminal 102 stored in the data buffer 111 is transmitted with the transmission mode determined by the mode determining unit 6, and also the user data is stored in the retransmission buffer 12 as the retransmission data.

Namely, at step S24, the packet data, in which the user data for the terminal 102 stored in the data buffer 111 are allocated, is transferred from the data buffer 111 to the adaptive coding and modulation unit 13. Then the control unit 7 controls the adaptive coding and modulation unit 13 as to carry out the encoding and modulation of the user data (the packet data in which the user data is allocated) for the terminal 102 with the transmission mode determined at the mode determining unit 6. The adaptive coding and modulation unit 13 encodes and modulates the user data for the terminal 102 supplied from the data buffer 111 in accordance with the control by the control unit 7, and supplies through the retransmission buffer 12 to the spreading unit 11, and further supplies to the retransmission buffer 12 to store as the retransmission data. Here-in-after, in the spreading unit 11 and the transmission/reception compatible unit 1, the same processing is carried out as explained in FIG. 2, and thereby the user data is transmitted from the antenna 14 to the terminal 102 as the signal of the downlink data channel.

As described above, the processing proceeds back to step S11 after the user data is transmitted, and the similar processing is repeated here-in-after.

On the contrary, at step S22, if it is determined that the user data addressed to the terminal 102 is not stored in the data buffer 111, then the processing proceeds to steps S25 to S27, and the transmission (retransmission) of the retransmission data stored in the retransmission buffer 12 is carried out.

Namely, at step S25, the control unit 7 determines whether there is a request for retransmission of the user data corresponding to the retransmission data or not, and whether the retransmission data for the terminal 102 stored in the retransmission buffer 12 or not.

At step S25, if it is determined that the retransmission data for the terminal 102 is not stored in the retransmission buffer 12, or that even it is stored, there is not any request for retransmission of the retransmission data, the processing proceeds back to step S11 by skipping steps S26 and S27, and then the similar processing is repeated here-in-after.

Further, at step S25, if it is determined that the retransmission data for the terminal 102 is stored in the retransmission buffer 12 and there is a request for retransmission of the user data corresponding to the retransmission data, the processing proceeds to step S26, and the control unit 7 supplies the transmission mode, which is the same transmission mode used when the user data corresponding to the retransmission data, to the control data generating unit 8, and the control data generating unit 8 generates the control data including its transmission mode. This control data is supplied from the control data generating unit 8 through the coding and modulation unit 9, the power adjusting unit 10, the spreading unit 11, and the transmission/reception compatible unit 1 to the antenna 14, and is transmitted as the signal of the downlink control channel.

After that, the processing proceeds to step S27, the retransmission data requested the retransmission and stored in retransmission buffer 12 is read out, and supplied to the spreading unit 11. Here-in-after, in the spreading unit 11 and the transmission/reception compatible unit 1, the same processing is carried out as explained in FIG. 2, and thereby the retransmission data is transmitted (retransmitted) from the antenna 14 to the terminal 102 as the signal of the downlink data channel.

As described above, the processing proceeds back to step S11 after the retransmission data is transmitted (retransmitted), and the similar processing is repeated here-in-after.

As described above, the base station 101 determines the possibility of transmitting the data to the terminal 102, and transmits the indicator ind indicative of the determined result to the terminal 102, so that the terminal 102 is possible to change the transmission frequency of the mode request message to the base station 101.

Further the base station 101 is possible to transmit the frequency information representing the transmission frequency for the mode request message, and in this case, it is possible to adaptively control the transmission frequency of the mode request message to the base station 101 by the terminal 102 in response to status of load in the base station 101.

Next, the processing by the terminal 102 in FIG. 2 is explained.

At the terminal 102, the signal of the downlink control channel is decoded and demodulated, and the indicator ind is obtained. Successively, it is determined whether the indicator is "0" or "1", and if "0", it is carried out the control where the mode request message to feed back the received signal quality of the terminal 102 to the base station is transmitted to the base station 101 at every M frames.

On the contrary, if the indicator bit is "1", it is carried out the control where the mode request message is transmitted to the base station 101 at every K frames, where K is smaller than M. Further, the terminal 102 checks the transmission mode among the control data included in the downlink control channel, and determines that the received data is transmitted by encoding which coding rate, and modulated by which modulation system. Namely, in the mode of the present embodiment, it is determined that the transmission mode is one of three transmission modes #0 to #2 comprised of a combination of QPSK and R=½, 16QAM and R=½, and 16QAM and R=¾, respectively. Then, the appropriate demodulation and the decoding are carried to the received data in response to its transmission mode, and here-in-after, the similar processing is repeated.

Next, the processing of the terminal 102 in FIG. 10 is further explained with reference to flowcharts in FIGS. 12 to 15.

Figure 12:
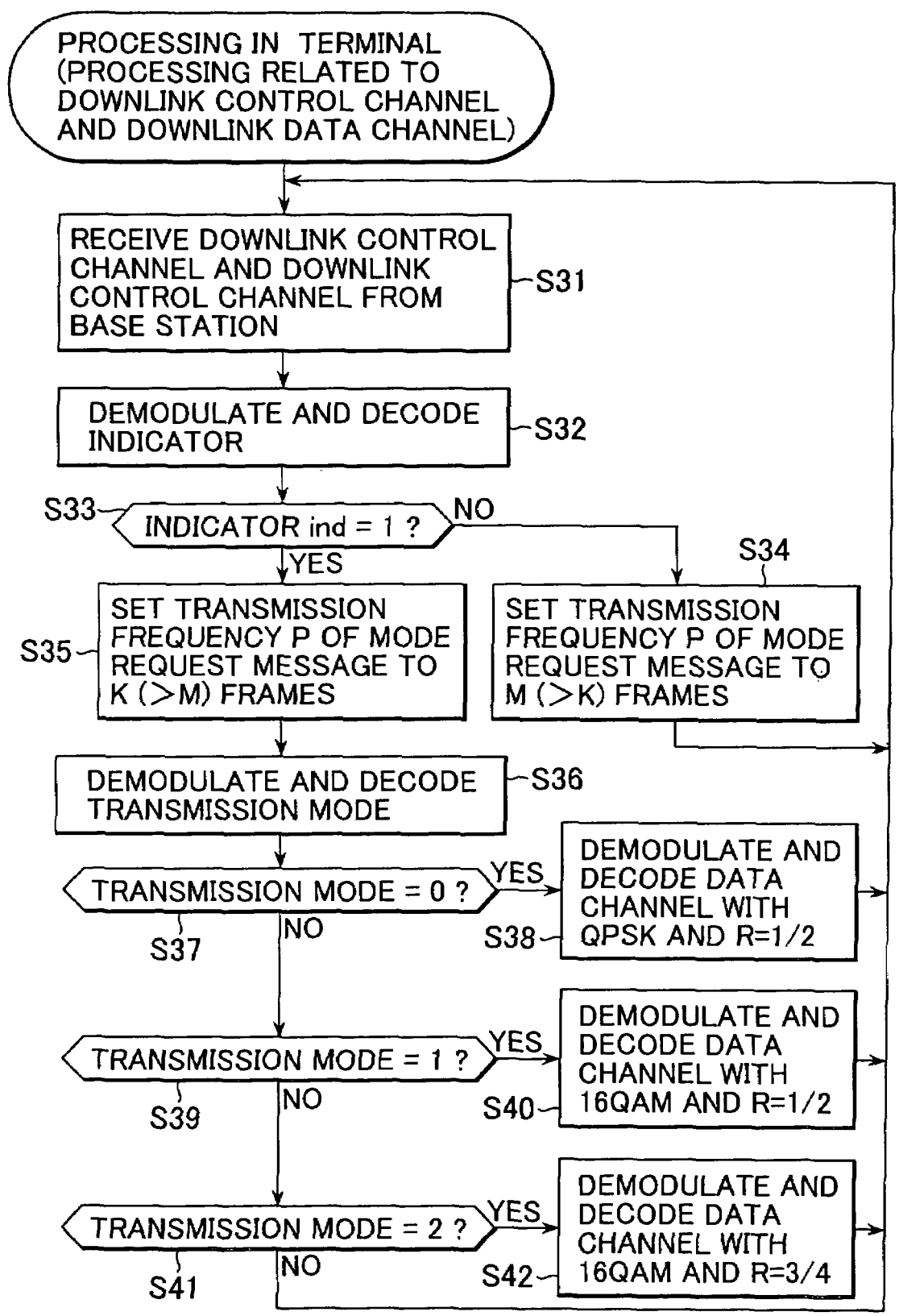
FIG. 12 is a flowchart showing a processing at the terminal 102.

Now, with reference to the flowchart in FIG. 12, the processing relating to the downlink control channel and the downlink data channel for processing the signals of the downlink control channel and the downlink data channel carried out by the terminal 102 is explained.

At first, at step S31, the signals from the downlink control channel and the downlink control channel transmitted from the base station 101 are received. Namely, at step S31, the signals from the downlink control channel and the downlink data channel transmitted from the base station 101 are received by the antenna 46, and supplied to the inverse spreading unit 32 after carried out necessary processing at the transmission/reception compatible unit 31. Further, at step S31, the inverse spreading unit 32 separates the signal from the transmission/reception compatible unit 31 by carrying out the spectrum inverse spreading processing into the signal of the downlink data channel and the signal of the downlink control channel shown in FIG. 1. Then, the inverse spreading unit 32 supplies the signal of the downlink control channel to a control channel received signal quality estimating unit 33 and a control data demodulation and decoding unit 37. Further, the inverse spreading unit 32 supplies the signal of the downlink data channel to a data channel received signal quality estimating unit 35 and a user data demodulation and decoding unit 39.

After that, the processing proceeds to step S32, and the control data demodulation and decoding unit 37 demodulates and decodes the indicator ind among the signals of the downlink control channel supplied from the inverse spreading unit 32, and supplies to a transmission mode determining unit 121, then, the processing proceeds to step S33.

In this case, if the frequency information is included in the signal of the downlink control channel, then, the control data demodulation and decoding unit 37 also demodulates and decodes the frequency information, and supplies to the transmission mode determining unit 121.

At step S33, the transmission mode determining unit 121 determines whether the indicator ind is "1" or not.

At step S33, if it is determined that the indicator ind is not "1", namely, the indicator ind is "0" indicating that there is no possibility of transmission of the data for the terminal 102, the processing proceeds to step S34, then the transmission mode determining unit 121 presets the transmission frequency P of the mode request message to M frames (preset its cycle to be at every M frames), and supplies to the data channel received signal quality estimating unit 35.

After that, the processing proceeds back to step S31, and here-in-after the similar processing is repeated.

Accordingly, in this case, the decoding and the demodulation for the downlink data channel are not carried out.

On the contrary, at step S33, if it is determined that the indicator ind is "1", namely, the indicator ind is "0" indicating that there is a possibility of transmitting the data for the terminal 102, the processing proceeds to step S35, then the transmission mode determining unit 121 presets the transmission frequency P of the mode request message to K frames smaller than M (preset its cycle to be at every K frames smaller than M frames), and supplies to the data channel received signal quality estimating unit 35.

Accordingly, if the indicator ind is "0", then the transmission frequency P is so as to preset that the transmission cycle of the mode request message is at every M frames, and if the indicator ind is "1", then the transmission frequency P is so as to preset that the transmission cycle of the mode request message is at every K frames. And, in the case of the mode of the present embodiment, as the relation between K and M is M>K as described above, if the indicator ind is either "0" or "1", the transmission frequency of the mode request message is preset to be either smaller or larger, respectively.

After that, the processing proceeds to step S36, the control data demodulation and decoding unit 37 starts to demodulate and decode the transmission mode among the signal of the downlink control channel supplied from the inverse spreading unit 32, and supplies the resultant transmission mode to the control unit 38.

Here, the control data demodulation and decoding unit 37 does not always demodulate and decode the transmission mode among the signal of the downlink control channel, but does start to demodulate and decode the transmission mode transmitted through the downlink control channel when the indicator ind is "1" indicating that there is a possibility of transmitting the data for the terminal 102. Namely, the control data demodulation and decoding unit 37 carries out the demodulation and decoding of the transmission mode when the indicator ind is "1", but does not carry out when the indicator ind is "0". Accordingly, the indicator ind is said to be information representing that there is a possibility of transmitting the data for the terminal 102, and also commanding the modulation and decoding of the transmission mode transmitted through the downlink control channel.

As described above, the demodulation and the decoding of the transmission mode transmitted through the downlink control channel is not always carried out, but is carried out when the indicator ind is "1", so that the load at the terminal 102 is reduced and further, it is possible to reduce the power consumption.

After the processing at step S36, the processing proceeds to step S37, and the control unit 38 determines whether the transmission mode supplied from the control data demodulation and decoding unit 37 is the transmission mode #0 or not. At step S37, if it is determined that the transmission mode supplied from the control data demodulation and decoding unit 37 is the transmission mode #0, then the processing proceeds to step S38, and the control unit 38 controls the user data demodulation and decoding unit 39 so as to QPSK demodulate and further to decode with the coding rate R=½ the signal of the downlink data channel supplied from the inverse spreading unit 32. Further, at step S38, the user data demodulation and decoding unit 39 supplies the user data obtained by demodulation and decoding the signal of the downlink data channel to an error detecting unit 40, then, the processing proceeds back to step S31.

Further, at step S37, if it is determined that the transmission mode supplied from the control data demodulation and decoding unit 37 is not the transmission mode #0, then the processing proceeds to step S39, and the control unit 38 determines whether the transmission mode supplied from the control data demodulation and decoding unit 37 is the transmission mode #1 or not. At step S39, if it is determined that the transmission mode supplied from the control data demodulation and decoding unit 37 is the transmission mode #1, then the processing proceeds to step S40, and the control unit 38 controls the user data demodulation and decoding unit 39 so as to 16QPSK demodulate and further to decode with the coding rate R=½ the signal of the downlink data channel supplied from the inverse spreading unit 32. Further, at step S40, the user data demodulation and decoding unit 39 supplies the user data obtained by demodulation and decoding the signal of the downlink data channel to the error detecting unit 40, then, the processing proceeds back to step S31.

Further, at step S39, if it is determined that the transmission mode supplied from the control data demodulation and decoding unit 37 is not the transmission mode #1, then the processing proceeds to step S41, and the control unit 38 determines whether the transmission mode supplied from the control data demodulation and decoding unit 37 is the transmission mode #2 or not. At step S41, the transmission mode supplied from the control data demodulation and decoding unit 37 is not the transmission mode #2, then the processing proceeds back to step S31 by skipping step S42.

Further, at step S41, if it is determined that the transmission mode supplied from the control data demodulation and decoding unit 37 is the transmission mode #2, then the processing proceeds to step S42, and the control unit 38 controls the user data demodulation and decoding unit 39 so as to 16QAM demodulate and further to decode with the coding rate R=¾ the signal of the downlink data channel supplied from the inverse spreading unit 32. Further, at step S42, the user data demodulation and decoding unit 39 supplies the user data obtained by demodulation and decoding the signal of the downlink data channel to the error detecting unit 40, then, the processing proceeds back to step S31.

Figure 13:
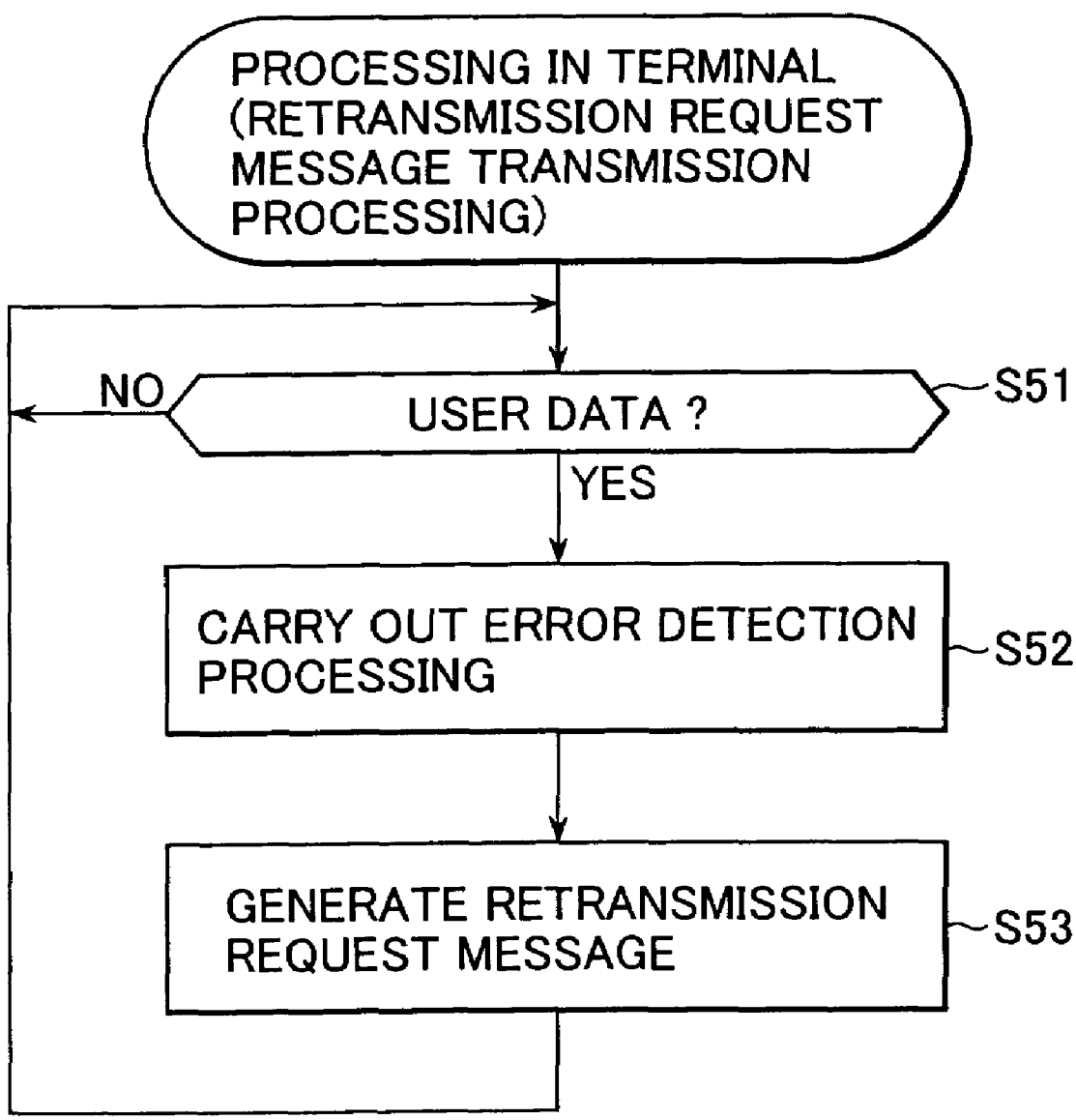
FIG. 13 is a flowchart showing a processing at the terminal 102.

Next, retransmission request message transmission processing for transmitting the retransmission request message carried out by the terminal 102 is explained with reference to a flowchart in FIG. 13.

At first, at step S51, the error detecting unit 40 determines whether the user data is supplied from the user data demodulation and decoding unit 39 or not, and if it is determined that it is not supplied, then the processing proceeds back to step S51.

Further, at step S51, if it is determined that the user data is supplied from the user data demodulation and decoding unit 39, the processing proceeds to step S52, and the error detecting unit 40 determines whether the user data supplied from the user data demodulation and decoding unit 39 include any error or not, and supplies the detecting result to the retransmission request message generating unit 41, then, the processing proceeds to step S53.

At step S53, when the retransmission request message generating unit 41 receives the detecting result from the error detecting unit 40 indicating that there is no error, it generates the retransmission request message having the value of "0", for example, and supplies to the retransmission request message inserting unit 42. Further, when the retransmission request message generating unit 41 receives the detecting result from the error detecting unit 40 indicating that there is some error, it generates the retransmission request message having the value of "1", for example, and supplies to the retransmission request message inserting unit 42.

The retransmission request message supplied to the retransmission request message inserting unit 42 is transmitted to the base station 101 by the uplink control channel by way of the mode request message inserting unit 43, the power control bit inserting unit 44, the spreading unit 45, the transmission/reception compatible unit 31, and the antenna 46, and after that, the processing proceeds back to step S51, then the similar processing is repeated.

Next, mode request message transmission processing for transmitting the mode request message carried out by the terminal 102 is explained with reference to a flowchart in FIG. 14.

At first, at step S61, the data channel received signal quality estimating unit 35 presets "0", for example, as an initial value to the variable p which counts the number of frames, then the processing proceeds to step S62. At step S62, the data channel received signal quality estimating unit 35 increments the variable p by "1", and the processing proceeds to step S63.

At step S63, the data channel received signal quality estimating unit 35 determines whether the variable p is more than transmission frequency P preset at step S34 or S35 in FIG. 12. At step S63, if it is determined that the variable p is not more than the transmission frequency P, then processing proceeds back to step S62, and here-in-after similar processing is repeated.

Further, at step S63, if it is determined that the variable p is more than the transmission frequency P, namely, the time more than P frames is to lapse since the previous transmission of the mode request message is carried out, then the processing proceeds to step S64, and the data channel received signal quality estimating unit 35 estimates the SNR, namely the received signal quality, of the signal of the downlink data channel supplied from the inverse spreading unit 32, and supplies to the mode selection unit 36, then the processing proceeds to step S65.

At step S65, the mode selection unit 36 determines (selects) the transmission mode based on the received signal quality at the terminal supplied from the data channel received signal quality estimating unit 35, and generates the mode request massage indicating the transmission mode. This mode request massage is transmitted from the mode selection unit 36 to the base station 101 by the uplink control channel by way of the mode request message inserting unit 43, the power control bit inserting unit 44, the spreading unit 45, the transmission/reception compatible unit 31, and the antenna 46, and after that, the processing proceeds back to step S61, then the similar processing is repeated.

Figure 14:
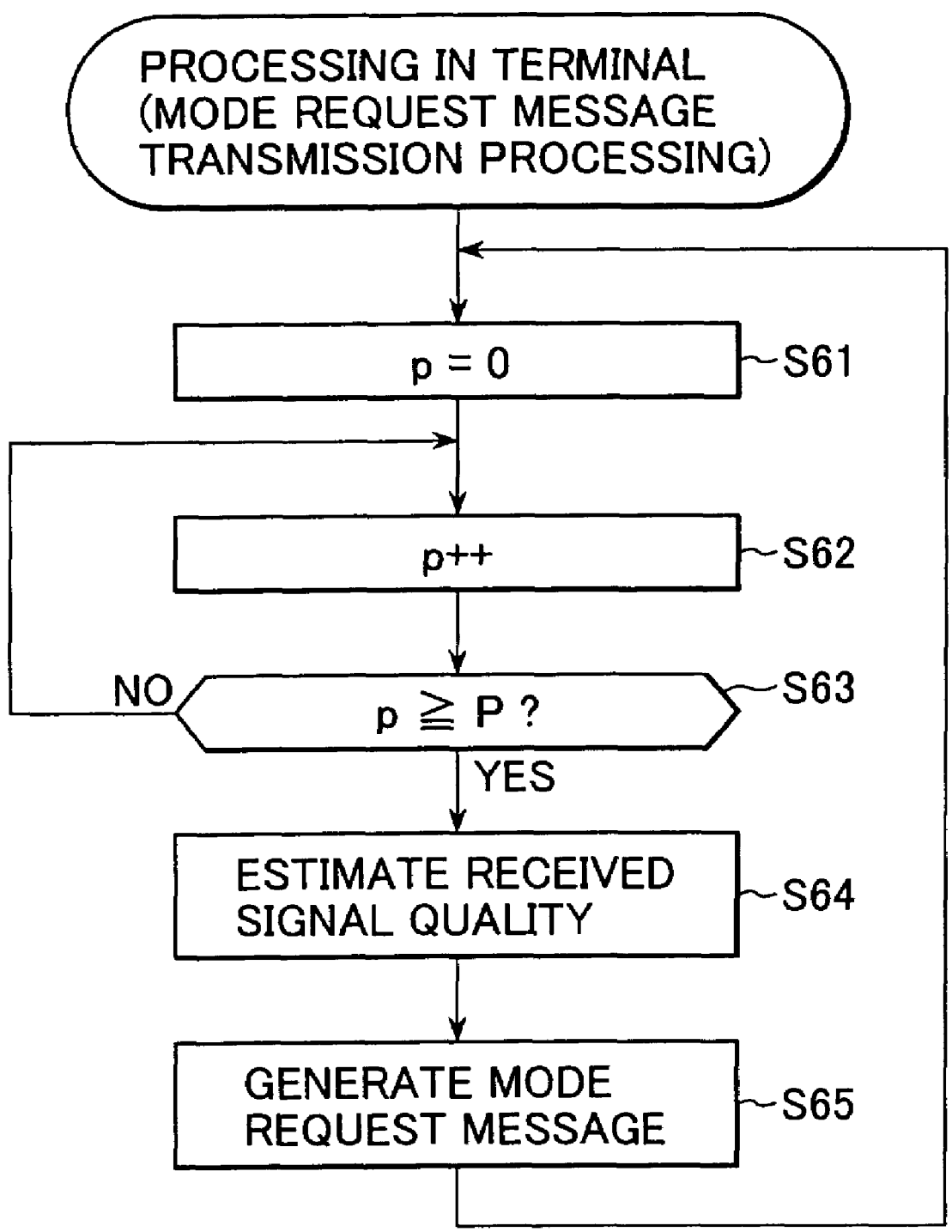
FIG. 14 is a flowchart showing a processing at the terminal 102.

Accordingly, in the mode request message transmission processing in FIG. 14, it is transmitted at every P frames represented by the transmission frequency P preset at step S34 or S35 in FIG. 12.

Namely, if the indicator ind is "0", the transmission frequency P is set so that the transmission cycle of the mode request message is to be at every M frames, and if the indicator ind is "1", the transmission frequency P is set so that the transmission cycle of the mode request message is to be at every K frames. Further, in the mode of the present embodiment, the relation between K and M is M>M, as described above, so that if the indicator ind is either "0" or "1", then, the mode request message is to be transmitted with low frequency or high frequency, respectively.

More specifically, for example, provided that K=1 and K=∞, the mode request message is not transmitted when the indicator ind is "0", and the mode request message is transmitted at every one frame when the indicator ind is "1".

As described above, the terminal 102 uses the indicator ind indicating the possibility of data transmission, and transmits the mode request message necessary for determining the adaptive modulation and coding rate only when there is a possibility of data transmission (for example, such condition where the data for the terminal 102 is existed at the base station 101, and the data is transmitted to the terminal 102 when the radio resources are available), thereby it is possible to save radio resources. Further, the if it is determined that there is no possibility of data transmission by the indicator ind (when the indicator ind is "0"), it becomes not necessary to receive information other than the indicator ind (if the frequency information is transmitted, the frequency information is included) in the control data, thereby, the processing at the terminal 102 is simplified, and it is possible to realize the low power consumption system.

Figure 15:
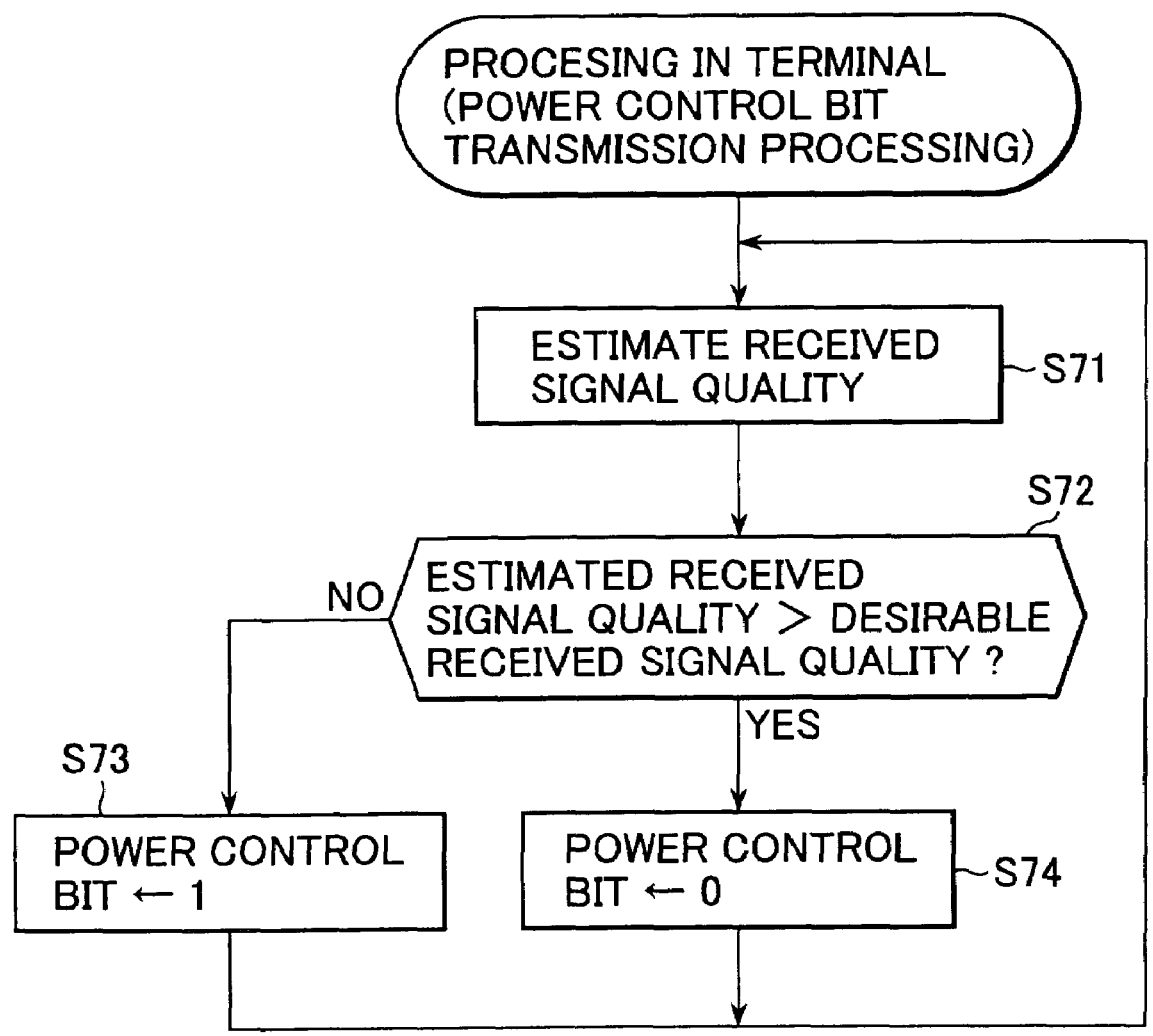
FIG. 15 is a flowchart showing a processing at the terminal 102.

Next, power control bit transmission processing for transmitting the power control bit carried out by the terminal 102 is explained with reference to a flowchart in FIG. 15.

At first, at step S71, the control channel received signal quality estimating unit 33 estimates the received signal quality which is the SNR of the signal of downlink control channel, and supplies the estimated received signal quality to the power control bit generating unit 34, then, the processing proceeds to step S72.

At step S72, the power control bit generating unit 34 determines whether the estimated received signal quality of the downlink control channel is better than the desirable received signal quality which is the desirable SNR. At step S72, if it is determined that the estimated received signal quality is not better than the desirable received signal quality, then the processing proceeds to step S73, and the power control bit generating unit 34 generates the power control bit having a value of "1". This power control bit is transmitted from the power control bit generating unit 34 to the base station 101 by the uplink control channel by way of the power control bit inserting unit 44, the spreading unit 45, the transmission/reception compatible unit 31, and the antenna 46, and after that, the processing proceeds back to step S71, then here-in-after, the similar processing is repeated.

At step S72, if it is determined that the estimated received signal quality is better than the desirable received signal quality, then the processing proceeds to step S74, and the power control bit generating unit 34 generates the power control bit having a value of "0". This power control bit is transmitted from the power control bit generating unit 34 to the base station 101 by the uplink control channel by way of the power control bit inserting unit 44, the spreading unit 45, the transmission/reception compatible unit 31, and the antenna 46, and after that, the processing proceeds back to step S71, then here-in-after, the similar processing is repeated.

Figure 16:
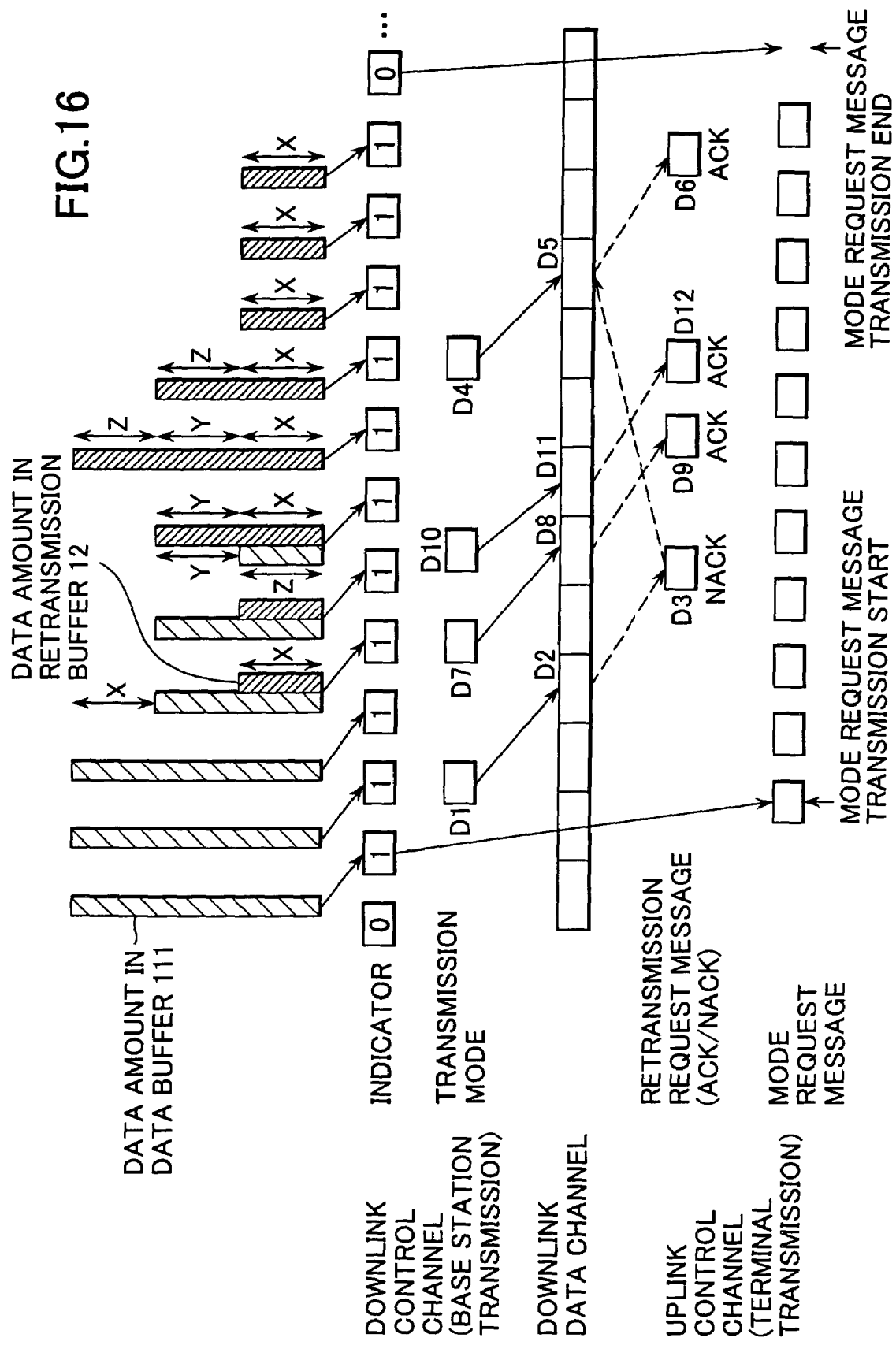
FIG. 16 is a chart showing communications between the base station 101 and the terminal 102.

Next, with reference to FIG. 16, communication exchange between the base station 101 and the terminal 102 is explained when the transmission frequencies K and M are set to be K=1, and M=∞, respectively. In this case, K=1 means that the mode request message is transmitted at every one frame when the indicator is "1", and M=∞ means that the mode request message is not utterly transmitted when the indicator is "0".

At the base station 101, when there is no possibility of transmitting the data to the terminal 102, the indicator having a value of "0" is transmitted. After that, in the base station 101 (FIG. 9), the user data for the terminal 102 is stored in the data buffer 111, the indicator that is changed the value of "0" to "1" is transmitted to the terminal 102 through the downlink control channel. In this case, in the base station 101, after the indicator having the value of "1" is started to transmit, the indicator having the value of "1" is continuously transmitted at every frame unit, for example, until the user data for the terminal 102 is not existed in the data buffer 111 or the retransmission buffer 12. Then, in the base station 101, if the user data for the terminal 102 is not existed in the data buffer 111 or the retransmission buffer 12, then the value of the indicator is set to be "0".

After the indicator is set to be "1", in the base station 101, the transmission mode (D1) for transmitting the user data for the terminal 102 stored in the data buffer 111, and the transmission mode (D1) is transmitted to the terminal 102. Further, in the base station 101, the user data for the terminal 102 stored in the data buffer 111 is encoded and modulated at the adaptive coding and modulation unit 13 in accordance with the transmission mode (D1) determined by the mode determining unit 6, and the corresponding amount of the encoded and modulated user data (D2) is transmitted to the terminal 102 by the downlink data channel.

In this case, if the data amount of the user data (D2) is expressed as X, the data amount (portion depicted with rough slanted lines in FIG. 16) in the data buffer 111 is decreased by the data amount X when the user data (D2) is transmitted. Further, in the base station 101, as the encoded and modulated user data (D2) is stored in the retransmission buffer 12 for retransmission as the retransmission data, the data amount of the retransmission buffer 12 (portion depicted with rough slanted lines in FIG. 16) is increased by the data amount X of the user data (D2).

At the terminal 102 (FIG. 10), the user data (D2) transmitted from the base station 102 is received, demodulated and decoded. Now, if there is any error in the user data (D2), NACK (D3) as the retransmission request massage for requesting retransmission is transmitted from the terminal 102 back to the base station 101. In this case, the retransmission data (user data (D2)) corresponding to the data amount X existed in the retransmission buffer 12 of the base station 101 is continuously stored in the retransmission buffer 12 until it is confirmed that the transmission is carried out without any error, namely, until the base station 101 receives ACK (Acknowledge) as a retransmission request message for not requesting retransmission from the terminal 102.

In a mode of the embodiment in FIG. 16, after that, at the base station 101, the transmission mode (D7) for transmitting next user data fro the terminal 102 stored in the data buffer 111 is determined, and the transmission mode (D7) is transmitted to the terminal 102. Further, at the base station 101, the next user data for the terminal 102 stored in the data buffer 111 is encoded and modulated in accordance with the transmission mode (D7) determined by the mode determining unit 6 in the adaptive coding and modulation unit 13, and thus encoded and modulated user data (D8) is transmitted through the downlink data channel to the terminal 102.

In this case, if the data amount of the user data (D8) is expressed as Y, the data amount in the data buffer 111 is decreased by the data amount Y when the user data (D8) is transmitted. Further, in the base station 101, as the encoded and modulated user data (D8) is stored in the retransmission buffer 12 for retransmission as the retransmission data, the data amount of the retransmission buffer 12 is increased by the data amount Y of the user data (D2).

At the terminal 102 (FIG. 10), the user data (D8) transmitted from the base station 101 is received, demodulated, and decoded. Now, if there is no error in the user data (D8), and it is normally received ate the terminal 102, then ACK (D9) as the retransmission request massage for not requesting retransmission (the retransmission message for representing that the transmitted data is normally received and requesting new user data) is transmitted from the terminal 102 back to the base station 101.

The base station 101 erases the retransmission data as the user data (D8) of the data amount Y stored in the retransmission buffer 12, as the transmission for the user data (D8) is successful when receives the ACK (D9).

In a mode of the embodiment in FIG. 16, after that, at the base station 101, the transmission mode (D10) for transmitting next user data fro the terminal 102 stored in the data buffer 111 is determined, and the transmission mode (D10) is transmitted to the terminal 102. Further, at the base station 101, further next user data for the terminal 102 stored in the data buffer 111 is encoded and modulated in accordance with the transmission mode (D10) determined by the mode determining unit 6 in the adaptive coding and modulation unit 13, and thus encoded and modulated user data (D8) is transmitted through the downlink data channel to the terminal 102.

In this case, if the data amount of the user data (D11) is expressed as Z, the data amount in the data buffer 111 is decreased by the data amount Z of the user data (D11) when the user data (D11) is transmitted.

Further, in the base station 101, as the encoded and modulated user data (D11) is stored in the retransmission buffer 12 for retransmission as the retransmission data, the data amount of the retransmission buffer 12 is increased by the data amount Z of the user data (D11). In addition, in the mode of the embodiment in FIG. 16, the data amount of the user data for the terminal 102 in the data buffer 111 is "0" by the transmission of the user data (D11).

At the terminal 102 (FIG. 10), the user data (D11) transmitted from the base station 101 is received, demodulated, and decoded. Now, if there is no error in the user data (D11) like the user data (D8), and is normally received at the terminal 102, then, ACK (D12) as the retransmission request message representing not requesting the retransmission is transmitted from the terminal 102 back to the base station 101.

The base station 101 erases the retransmission data as the user data (D11) of the data amount Z stored in the retransmission buffer 12, as the transmission for the user data (D11) is successful when receives the ACK (D9).

At the base station 101, when the transmission of the user data (D11) of data amount Z is completed, retransmission operation for the user data (D2) of the data amount X is started. Namely, the base station 101 determines the transmission mode (D4) for transmitting the retransmission data as the user data (D11) stored in the retransmission buffer 12 to be the same transmission mode with which the user data (D2) is transmitted at first, and further transmits the transmission mode (D4) to the terminal 102. Further, at the base station 101, the same retransmission data (D5) as the user data (D2) stored in the retransmission buffer 12 is transmitted through the downlink data channel to the terminal 102.

At the terminal 102 (FIG. 10), the retransmission data (D5) transmitted from the base station 101 is received, and demodulated and decoded. Now, if there is no error in the retransmission data (D5), and is normally received at the terminal 102, then, ACK (D6) as the retransmission request message representing not requesting the retransmission is transmitted from the terminal 102 back to the base station 101.

The base station 101 erases the retransmission data (D5) (same as the user data (D2)) of the data amount X stored in the retransmission buffer 12, as the transmission for the user data (D5) is successful when receives the ACK (D6).

As shown in FIG. 16, the base station 101 set the indicator to be "1" when the user data or the retransmission data for the terminal 102 is existed in the data buffer 111 or the retransmission buffer 12, and the terminal 102 that receives the indicator transmits the mode request message back to the base station 101 at every K frames, namely every one frame in case of the mode of the embodiment in FIG. 16 as the transmission frequency K is K=1. Further, when the user data or retransmission data for the terminal 102 becomes nothing in the data buffer 112 or the retransmission buffer 12, the base station 101 sets the indicator included in the control data to be "0", then, the terminal 102 that receives the indicator returns the mode request message at every M frames, namely in the mode of the embodiment in FIG. 16, prohibits the return of the mode request message as the transmission frequency M is M=∞.

In this case, in the mode of the embodiment in FIG. 16, as the transmission frequency M is set to be M=∞, so that when the data is not existed in the data buffer 111 or the retransmission buffer 12, the terminal 102 does not carry out return of the mode request message, but the transmission frequency M is able to be set to finite value. In this case, in the terminal 102, when the indicator designates "0", the mode request message is returned to the base station 101 at every M frames.

As described above, the terminal 102 frequently transmits the mode request message determining the transmission mode to the terminal 102 based on the indicator transmitted from the base station 101 only when requested from the base station 101. Accordingly, it is possible to save the radio resources of the terminal 102, and to reduce the power consumption.

Now description will be made on that the processing of the above-described control data generating unit 112 and the transmission mode determining unit 121 of the terminal 102 can be effected on the hardware base or software base. If a series of processing is carried out based on software, a program constituting the software is installed in a general-purpose computer or the like.

Figure 17:
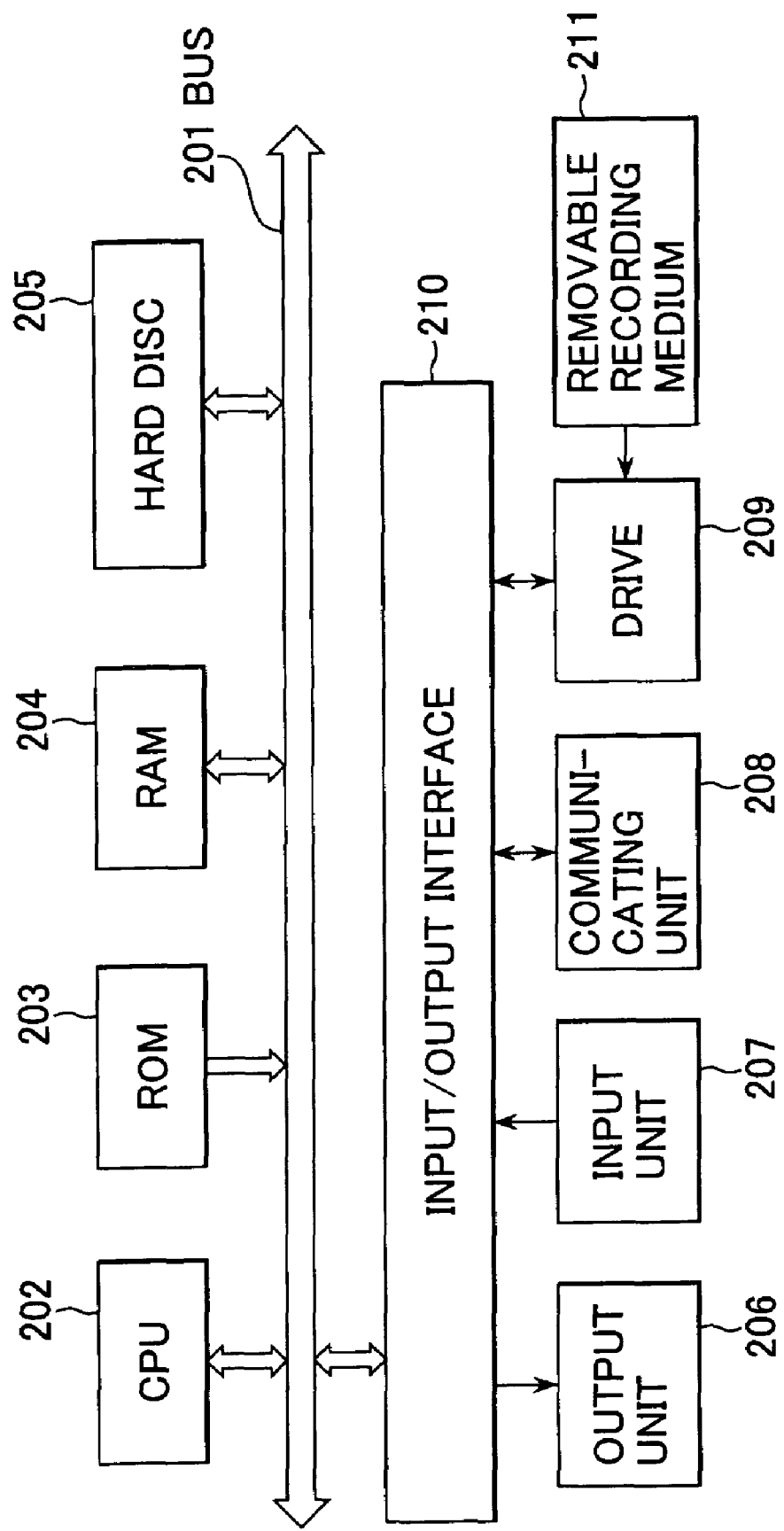
FIG. 17 is a block diagram showing an example of an arrangement of one embodiment as a computer to which the present invention is applied.

FIG. 17 is a diagram showing an arrangement of one embodiment as a computer having a program for executing the above-described series of processing.

The program may be recorded in advance in a hard disc 205 or a ROM 203 as a recording medium provided within the computer.

Alternatively, the program may be stored (recorded) temporarily or permanently in a removable recording medium 211 such as a flexible disc, a CD-ROM (Compact Disc Read Only Memory), MO (Magneto Optical) disc, a DVD (Digital Versatile Disc), a magnetic disc, or a semiconductor memory. These kinds of removable recording medium 211 may be offered as a package software.

The program may be installed from the above-described removable recording medium 211 into the computer, or alternatively, the program may be transferred from a download site through an earth satellite such as a digital broadcast satellite to the computer in a radio transmission manner. Furthermore, the program may be transferred from the download site through any network such as a LAN (Local Area Network), the internet to the computer in a cable communication manner. The computer may receive the program transferred in the above manner at a communicating unit 208 and the program may be installed in the hard disc 205 provided in the computer.

The computer has a CPU (Central Processing Unit) 202 provided therein. The CPU 202 is connected with an input/output interface 210 through a bus 201. When a user operates an input unit 207 composed of a keyboard, a mouse, a microphone or the like to enter a command and the command is supplied to the CPU 202 through the input/output interface 210, the program stored in the ROM (Read Only Memory) is executed in accordance with the command. Alternatively, the CPU 202 loads the program on the RAM (Random Access Memory) 204 and executes the program. The program may be obtained by reading the hard disc 205 having the program stored therein, by being transferred through the satellite or the network and received at the communicating unit 208 and installed in the hard disc 205, or by reading from the removable recording medium 211 attached to the drive 209. In this way, the CPU 202 carries out the processing in accordance with the above-described flowchart. Alternatively, the arrangement shown in the above block diagram carries out the processing. Thereafter, the CPU 202 generates the result of processing through the input/output interface 210, for example, to an output unit 206 composed of a LCD (Liquid Crystal Display) depending on necessity. Alternatively, the result of processing may be transmitted from the communicating unit 208, recorded in the hard disc 205, or subjected to any other processing.

In this specification, the processing steps describing the program for making the computer carry out the various processing should not be always processed in the chronological sequence which is illustrated in the flow chart. The description of the present specification intends to include a manner of processing in which these processing steps are executed in a parallel fashion or executed separately (e.g., parallel processing or object oriented processing).

Further, the program may be processed by a single unit of computer or by a plural units of computers in a distributed manner. Further, the program may be transferred to a computer far away from the communication system and executed in the computer.

Further, the present invention can be applied to various kinds of communication systems in which the base station determines the coding rate and the modulation system for the data to be transmitted to the terminal based on the predetermined information from the terminal.

For example, in the HDR system, the transmission mode is determined in the terminal based on its received signal quality, and the mode request message indicating its transmission mode is transmitted to the base station, therefore, this invention is, of course, applicable to a communication system where the mode request message is transmitted from the terminal to the base station, and further applicable to other such system as communication system like a W-CDMA system.

Namely, for example, in the W-CDMA system, the received signal quality message indicating the received signal quality at the terminal is transmitted from the terminal to the base station, and the transmission mode is determined, at the base station, based on the received signal quality indicated by the received signal quality message. The present invention is applicable to a system where the transmission mode is determined at the base station based on the received signal quality at the terminal.

Further, in the mode of the present embodiment, the transmission mode and the downlink control channel for transmitting the indicator are not particularly distinguished, but the transmission mode and the downlink control channel is able to be transmitted through the same channel or different channel.

INDUSTRIAL APPLICABILITY

As described above, according to the present invention, it becomes possible to save the radio resources.

The invention claimed is:

1. A transmission apparatus which changes adaptively a modulation rate and a modulation system for data based on a predetermined information transmitted from a receiving apparatus for receiving data, said transmission apparatus comprising:

determining means for determining whether there is data to be sent to said receiving apparatus;

transmitting means for transmitting to said receiving apparatus information indicating whether data is to be transmitted to said receiving apparatus, and frequency information designating a transmission frequency representing the number of transmission of said predetermined information in a predetermined period of time; and memory means for storing said data, wherein said determining means determines whether to transmit the data to the receiving apparatus depending on whether said data is stored in said memory means.

2. The transmission apparatus according to claim 1, wherein said information indicating whether data is to be transmitted and said frequency information are corresponded to each other, and wherein said transmission means equivalently transmits said information indicating whether data is to be transmitted and said frequency information corresponded to said information indicating whether data is to be transmitted to said receiving apparatus.

3. The transmission apparatus according to claim 1, wherein said data stored in said memory means is used to retransmit the data to said receiving apparatus.

4. A transmission control method for a transmitting apparatus which adaptively changes a modulation rate and a modulation system for data based on a predetermined information transmitted from a receiving apparatus for receiving data, said transmission control method for said transmission apparatus comprising:

a determining step for determining whether there is data is to be sent to said receiving apparatus;

transmitting step for transmitting to said receiving apparatus information indicating whether data is to be transmitted to said receiving apparatus, and frequency information designating a transmission frequency representing the number of transmission of said predetermined information in a predetermined period of time; and a storage step for storing said data;

wherein said determining step determines whether to transmit the data to the receiving apparatus depending on whether said data is stored in said storage step.

5. A computer-readable medium storing a computer program executable by a computer, which executes a transmission control processing of a transmitting apparatus for transmitting data to a receiving apparatus based on a predetermined information transmitted from a receiving apparatus for receiving data, said computer program, when executed, causes the computer to perform the steps of:

determining whether there is data is to be sent to said receiving apparatus;

transmitting to said receiving apparatus information indicating whether data is to be transmitted to said receiving apparatus, and frequency information designating a transmission frequency representing the number of transmission of said predetermined information in a predetermined period of time; and a storage step for storing said data, wherein said determining step determines whether to transmit the data to the receiving apparatus depending on whether said data is stored in said storage step.

6. A receiving apparatus for receiving data transmitted from a transmitting apparatus which changes a coding rate and a modulation system and transmits said data, said receiving apparatus comprising:

generating means for generating a predetermined information for determining said coding rate and modulation system at said transmitting apparatus;

setting means for setting a transmission frequency representing the number of transmission of said predetermined information in a predetermined period of time based on information indicating whether there is data to be sent from said transmitting apparatus; and transmitting means for transmitting said predetermined information to said transmitting apparatus at the transmission frequency set at said setting means, wherein said setting means sets a first transmission frequency when there is data to be sent from said transmitting apparatus, and sets a second transmission frequency, which is lower than said first transmission frequency, when there is no data to be sent from said transmitting apparatus.

7. The receiving apparatus according to claim 6, wherein the information indicating whether there is data to be sent is corresponded to frequency information directing a transmission frequency representing the number of transmission of said predetermined information in a predetermined period of time, and wherein said setting means sets the transmission frequency represented by said frequency information corresponded to said information indicating whether there is data to be sent from said transmitting apparatus.

8. The receiving apparatus according to claim 6 wherein said transmitting apparatus transmits said information indicating whether there is data to be sent, and further comprising:

receiving means for receiving information transmitted from said transmitting apparatus.

9. The receiving apparatus according to claim 8, wherein said transmission apparatus transmits frequency information designating transmission frequency for the predetermined information, wherein said receiving means also receives said frequency information, and wherein said setting means sets the transmission frequency indicated by said frequency information based on said information indicating whether there is data to be sent from said transmitting apparatus.

10. A receiving apparatus for receiving data transmitted from a transmitting apparatus which changes a coding rate and a modulation system and transmits said data, said receiving apparatus comprising:

generating means for generating a predetermined information for determining said coding rate and modulation system at said transmitting apparatus;

setting means for setting a transmission frequency representing the number of transmission of said predetermined information in a predetermined period of time based on information indicating whether there is data to be sent from said transmitting apparatus;

transmitting means for transmitting said predetermined information to said transmitting apparatus at the transmission frequency set at said setting means, wherein said transmission apparatus transmits a transmission mode indicating the coding rate and the modulation system for said data; and demodulation and decoding means for starting demodulation and decoding of said transmission mode corresponding to said information indicating whether there is data to be sent from said transmitting apparatus.

11. A reception control method for a receiving apparatus which receives data transmitted from a transmitting apparatus which adaptively changes a coding rate and a modulation system and transmits said data, said reception control method comprising:

generating means for generating a predetermined information for determining said coding rate and modulation system at said transmitting apparatus;

setting means for setting a transmission frequency representing the number of transmission of said predetermined information in a predetermined period of time based on whether there is data to be sent from said transmitting apparatus; and transmitting means for transmitting said predetermined information to said transmitting apparatus at the transmission frequency set at said setting means, wherein said setting means sets a first transmission frequency when there is data to be sent from said transmitting apparatus, and sets a second transmission frequency, which is lower than said first transmission frequency, when there is no data to be sent from said transmitting apparatus.

12. A communication system comprising:

a receiving apparatus for receiving data; and a transmission apparatus for adaptively changing a coding rate and a modulation system for said data based on a predetermined information transmitted from said receiving apparatus and for transmitting said data to said receiving apparatus; said communication system is characterized in which:

said transmission apparatus includes:

determining means for determining whether there is data to be sent to said receiving apparatus;

a first transmitting means for transmitting to said receiving apparatus information indicating whether the data is to be transmitted to said receiving apparatus; and memory means for storing said data, wherein said determining means determines whether to transmit the data to the receiving apparatus depending on whether said data is stored in said memory means: and said receiving apparatus includes:

generating means for generating said predetermined information for determining said coding rate and the modulation system in the transmitting apparatus;

setting means for setting transmission frequency representing the number of transmission of the predetermined information in a predetermined period of time based on information indicating whether there is data to be sent from said transmitting apparatus; and a second transmitting means for transmitting said predetermined information to said transmitting apparatus at transmission frequency set by said setting means, wherein said setting means sets a first transmission frequency when there is data to be sent from said transmitting apparatus, and sets a second transmission frequency, which is lower than said first transmission frequency, when there is no data to be sent from said transmitting apparatus.

* * * * *